United States Patent
Mestré et al.

(10) Patent No.: US 10,147,077 B2
(45) Date of Patent: Dec. 4, 2018

(54) FINANCIAL TRANSACTION METHOD AND SYSTEM HAVING AN UPDATE MECHANISM

(75) Inventors: Patrick Mestré, Namur (BE); Cristian Radu, Beauvechain (BE); David A. Roberts, Warrington (GB); Edward L. H. Van de Velde, Leuven (BE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 183 days.

(21) Appl. No.: 13/825,115

(22) PCT Filed: Sep. 21, 2010

(86) PCT No.: PCT/EP2010/063920
§ 371 (c)(1),
(2), (4) Date: Mar. 19, 2013

(87) PCT Pub. No.: WO2012/037971
PCT Pub. Date: Mar. 29, 2012

(65) Prior Publication Data
US 2013/0185167 A1 Jul. 18, 2013

(51) Int. Cl.
*G06G 1/12* (2006.01)
*G06Q 20/20* (2012.01)
(Continued)

(52) U.S. Cl.
CPC .......... *G06Q 20/202* (2013.01); *G06Q 20/20* (2013.01); *G06Q 20/4033* (2013.01);
(Continued)

(58) Field of Classification Search
USPC ......................................................... 705/21
See application file for complete search history.

(56) References Cited

U.S. PATENT DOCUMENTS 5,231,569 A * 7/1993 Myatt et al. .................... 705/38
5,495,098 A * 2/1996 Pailles ................ G06Q 20/341
235/380
(Continued)

FOREIGN PATENT DOCUMENTS

EP 2085921 A1 8/2009

OTHER PUBLICATIONS

EMVCO, EMV2000 Integrated Circuit Card Specification for Payment Systems, Book 3—Application Specification. 2000. Retrieved from the Internet: http://www.emvco.com/specifications.cfm [retrieved on Mar. 2, 2005] (164 pages).
(Continued)

*Primary Examiner* — Ashford S Hayles
(74) *Attorney, Agent, or Firm* — Ballard Spahr LLP

(57) ABSTRACT

A payment device and method and system for using the payment device is described capable of utilizing a pre-authorized amount on existing infrastructure, including POS terminals or for using offline pre-paid products on this infrastructure. The updates for the pre-authorized or offline prepaid products can be sent by the issuer and applied by the card contemporaneously with the card's processing of the issuer authentication data but without requiring any additional bytes in the issuer authentication data. The updates performed by the issuer can be larger and more extensive than could be achieved by using any available space in the issuer authentication data.

25 Claims, 8 Drawing Sheets

(51) Int. Cl.
*G06Q 20/40* (2012.01)
*G07F 7/10* (2006.01)
*G07F 7/12* (2006.01)

(52) U.S. Cl.
CPC ........... *G06Q 20/4037* (2013.01); *G07F 7/10* (2013.01); *G07F 7/127* (2013.01)

(56) References Cited

U.S. PATENT DOCUMENTS

| | | | |
|---|---|---|---|
| 5,644,118 A * | 7/1997 | Hayashida | 235/379 |
| 5,949,043 A * | 9/1999 | Hayashida | 235/379 |
| 6,003,762 A * | 12/1999 | Hayashida | 235/379 |
| 6,003,767 A * | 12/1999 | Hayashida | 235/380 |
| 6,434,238 B1 * | 8/2002 | Chaum | G06Q 20/341 380/30 |
| 6,450,407 B1 * | 9/2002 | Freeman et al. | 235/492 |
| 7,103,575 B1 * | 9/2006 | Linehan | G06Q 20/12 235/379 |
| 7,567,920 B2 * | 7/2009 | Hammad et al. | 705/13 |
| 7,600,673 B2 * | 10/2009 | Stoutenburg et al. | 235/380 |
| 7,664,702 B2 * | 2/2010 | Jung | G06Q 20/10 235/380 |
| 7,765,162 B2 * | 7/2010 | Binder et al. | 705/66 |
| 7,806,323 B2 * | 10/2010 | Fomitchev | 235/380 |
| 8,245,044 B2 * | 8/2012 | Kang | 713/176 |
| 8,370,258 B2 * | 2/2013 | Roberts et al. | 705/44 |
| 8,458,071 B2 * | 6/2013 | Martin et al. | 705/35 |
| 8,544,735 B2 * | 10/2013 | Mestre | 235/380 |
| 8,602,293 B2 * | 12/2013 | Hammad | G06Q 20/12 235/375 |
| 8,620,806 B2 * | 12/2013 | Prada Peyser et al. | 705/39 |
| 9,317,845 B1 * | 4/2016 | Ekselius | G06Q 20/204 |
| 9,785,923 B2 * | 10/2017 | Barsukov | G06Q 20/10 |
| 2002/0082995 A1 * | 6/2002 | Christie, IV | 705/44 |
| 2002/0153414 A1 * | 10/2002 | Stoutenburg et al. | 235/380 |
| 2003/0150915 A1 * | 8/2003 | Reece | 235/449 |
| 2004/0210566 A1 * | 10/2004 | Smith | G06Q 20/341 |
| 2004/0230535 A1 * | 11/2004 | Binder | G06Q 20/04 705/64 |
| 2005/0156026 A1 | 7/2005 | Ghosh et al. | |
| 2007/0084913 A1 * | 4/2007 | Weston | 235/380 |
| 2007/0168260 A1 * | 7/2007 | Cunescu et al. | 705/26 |
| 2007/0241201 A1 * | 10/2007 | Brown | G06Q 20/26 235/493 |
| 2008/0208743 A1 * | 8/2008 | Arthur et al. | 705/41 |
| 2008/0208762 A1 * | 8/2008 | Arthur et al. | 705/79 |
| 2009/0030842 A1 * | 1/2009 | Hoffman | G06Q 20/04 705/66 |
| 2009/0119213 A1 * | 5/2009 | Hammad et al. | 705/44 |
| 2009/0121016 A1 * | 5/2009 | Hammad et al. | 235/382 |
| 2009/0204545 A1 * | 8/2009 | Barsukov | G06Q 20/10 705/75 |
| 2009/0248526 A1 * | 10/2009 | Park et al. | 705/14.15 |
| 2009/0265260 A1 * | 10/2009 | Aabye | G06Q 20/0655 705/30 |
| 2010/0125737 A1 * | 5/2010 | Kang | 713/176 |
| 2010/0131413 A1 * | 5/2010 | Kranzley | G06Q 20/105 705/66 |
| 2010/0153267 A1 * | 6/2010 | Ghaidan | G06Q 20/105 705/41 |
| 2010/0211504 A1 * | 8/2010 | Aabye et al. | 705/44 |
| 2010/0274712 A1 * | 10/2010 | Mestre | G06K 19/07749 705/39 |
| 2010/0274722 A1 * | 10/2010 | Roberts et al. | 705/44 |
| 2010/0318446 A1 * | 12/2010 | Carter | 705/30 |
| 2011/0022517 A1 * | 1/2011 | Hammad | 705/44 |
| 2011/0042456 A1 * | 2/2011 | Masaryk | G06Q 20/20 235/380 |
| 2011/0125642 A1 * | 5/2011 | Kamal | 705/44 |
| 2011/0251910 A1 * | 10/2011 | Dimmick | 705/17 |
| 2012/0036073 A1 * | 2/2012 | Basu et al. | 705/44 |
| 2012/0254037 A1 * | 10/2012 | Mullen | 705/44 |
| 2012/0271768 A1 * | 10/2012 | Kang | 705/44 |
| 2012/0286928 A1 * | 11/2012 | Mullen et al. | 340/5.61 |
| 2012/0298747 A1 * | 11/2012 | Mestre | G06Q 20/354 235/380 |
| 2013/0018781 A1 * | 1/2013 | Prada Peyser et al. | 705/39 |
| 2013/0024363 A1 * | 1/2013 | Cunescu et al. | 705/39 |
| 2013/0060696 A1 * | 3/2013 | Martin et al. | 705/44 |
| 2013/0080274 A1 * | 3/2013 | Pochic | G06Q 20/409 705/16 |
| 2013/0132274 A1 * | 5/2013 | Henderson et al. | 705/41 |
| 2013/0159119 A1 * | 6/2013 | Henderson et al. | 705/21 |
| 2013/0185152 A1 * | 7/2013 | Aaron et al. | 705/14.51 |
| 2013/0185167 A1 * | 7/2013 | Mestre | G06Q 20/20 705/21 |
| 2013/0185208 A1 * | 7/2013 | Aaron et al. | 705/44 |
| 2013/0191288 A1 * | 7/2013 | Hoffman | G06Q 20/04 705/66 |
| 2013/0246269 A1 * | 9/2013 | Roberts et al. | 705/44 |
| 2013/0262313 A1 * | 10/2013 | Martin et al. | 705/44 |
| 2014/0012689 A1 * | 1/2014 | Henderson et al. | 705/18 |
| 2014/0012757 A1 * | 1/2014 | Henderson et al. | 705/44 |
| 2014/0122526 A1 * | 5/2014 | Smith | G06Q 20/341 707/769 |
| 2014/0344166 A1 * | 11/2014 | Maddocks | G06O 20/4012 705/72 |
| 2015/0310421 A1 * | 10/2015 | Xie | G06Q 20/3278 705/44 |
| 2016/0307188 A1 * | 10/2016 | Zarakas | G06Q 20/341 |
| 2017/0061409 A1 * | 3/2017 | Morecki | G06Q 50/01 |
| 2017/0161978 A1 * | 6/2017 | Wishne | G07C 9/00309 |
| 2018/0068303 A1 * | 3/2018 | Wall | G06N 5/048 |

OTHER PUBLICATIONS

Richter, L. et al., Java card. 1999. pp. 1-14. Retrived from the Internet: http://www.ifi.uzh.ch/~riedl/lectures/java_card.htm [retrieved on Apr. 21, 2011] (11 pages).

International Search Report and Written Opinion dated May 10, 2011 by the International Searching Authority for Patent Application No. PCT/EP2010/063920, which was filed on Sep. 21, 2010 and published as WO 2012/037971 on Mar. 29, 2012 (Inventor—Mestré et al.; Applicant—Mastercard International, Inc.) (9 pages).

International Preliminary Report on Patentability dated Nov. 27, 2012 by the International Searching Authority for Patent Application No. PCT/EP2010/063920, which was filed on Sep. 21, 2010 and published as WO 2012/037971 on Mar. 29, 2012 (Inventor—Mestré et al.; Applicant—Mastercard International, Inc.) (6 pages).

\* cited by examiner

FINANCIAL TRANSACTION METHOD AND SYSTEM HAVING AN UPDATE MECHANISM

FIELD OF THE INVENTION

The present invention relates generally to a system and method for performing financial transactions with a payment device such as a payment card and more particularly relates to a system and method for performing financial transactions with a payment device such as an integrated circuit card, e.g. a pre-authorized product, or offline pre-paid product.

BACKGROUND OF THE INVENTION

With the advancement of the computer industry, the use of payment devices such as cards, typically magnetic stripe cards or smartcards, has become the preferred method of transacting business. Using such payment cards simplifies the purchase of goods and/or services by avoiding the necessity of using cash for such transactions. Facilitating the use of these payment cards are electronic payment or card accepting terminals, such as credit card reading terminals.

In recent years, an electronic wallet system has been suggested in which a monetary amount can be exchanged by communication between integrated circuit ("IC") cards or between an IC card and a point of sale ("POS") terminal. The IC card used for this system includes a microprocessor having a communication function and a memory such as electrically erasable programmable read-only memory ("EEPROM") for storing a processing program, such as the MONDEX™ electronic cash application developed by Mondex International, Ltd. The processing program is capable of configuring the IC card to function as a credit card, a debit card or an electronic cash card.

If configured to function as a cash card, the IC card can be used for offline commercial transactions of merchandises, commodities and the like, and to allow information or data representing a monetary amount to be stored in a memory incorporated in the IC card. When the IC card runs out of electronic cash, the cardholder must deposit additional cash onto the IC card using a specialized terminal.

In a typical transaction involving the purchase of an item or of a service, the payment device is presented at a point of sale terminal ("POS terminal"). The POS terminal has a card reader that can read data stored on the payment device, this data including identification or authentication data. Independent of whether the payment device is configured as a cash, credit or debit card, information of the monetary amount involved in the transaction is transferred to the POS terminal, which initiates an authorization request for an eventual authorization from a payment card issuing agency. Accordingly, data read from the payment device is provided to the merchant's transaction processing system and then to an Acquirer, which is typically a bank or other institution that manages the merchant's account. The data provided to the Acquirer may then be provided to a payment network where the transaction data is processed to determine if the transaction should be authorized. Clearance and account settlement for completed transactions are also performed on the payment network. Whether the IC card is configured as a credit card or a debit card, the cardholder must have a credit account or a bank account, respectively, known by the issuing agency in order to use the IC card. Communication between the payment network and the bank (known as the Issuer) that issued the payment device to the consumer may be required to complete the transaction. The Issuer can send data back to the payment device an Issuer Update of records of the transactions, e.g. a current balance. This can be achieved by setting or resetting a counter. Authorization for the transaction does not always need to be obtained from the Issuer. The payment device may be provided with a pre-authorized limit representing the maximum value which may be utilized with said device for at least one off-line transaction without communication with said payment network for authorization of said transaction.

The EMV transaction flow begins when the payment device is read at a terminal, e.g. is inserted into a reader at the merchant terminal. The terminal reads data from the card for use in its risk management and to establish the card authenticity. There are two types of card authentication, Static and Dynamic Data Authentication (SDA and DDA), where not all cards support DDA. DDA is further divided into basic DDA and DDA combined with Application Cryptogram generation (called CDA, which stands for Combined DDA/AC Generation). For the card to support DDA it must have its own signature key pair and the means to generate signatures. In both cases the terminal uses a stored copy of the card brand public key to verify the issuer public key certificate; in DDA, the terminal also verifies an issuer-signed certificate for the card public key. In SDA, the terminal verifies the issuer's signature on critical card resident data so that unauthorized alteration of issuer data after personalization is detected. In DDA, the terminal uses a public key based challenge response protocol to authenticate the card and verify the integrity of card resident data.

Next the Cardholder verification method is invoked to ensure that the person presenting the card is the one to whom the card was issued. For this purpose EMV uses a secret PIN, where this PIN can be verified either offline by the card or online by the issuer. Upon successful cardholder verification, the terminal then performs terminal risk management and decides whether the transaction should be approved offline, declined offline, or an online authorization is necessary. Providing it does not reject the payment at this stage, the terminal passes the payment request to the card in the form of a GENERATE AC command. In response, the card performs its own card risk management and card 'action analysis'. Depending on the card risk management policy the card's action analysis can return one of three results:

1. A Transaction Certificate (TC), when the payment is approved offline.
2. An Authorisation ReQuest Cryptogram (ARQC), when either the card or the terminal want to go online so that the issuer can authorize or reject the transaction. The issuer then responds with an Authorisation ResPonse Cryptogram (ARPC) which the card verifies and acts on. The terminal then issues a second GENERATE AC command that includes the issuer response. If the transaction is approved by the issuer, the card computes a transaction certificate (TC).
3. An Application Authentication Cryptogram (AAC), when the request is declined.

Finally, by returning either a TC or an AAC to either the first or second GENERATE AC command issued by the terminal, the card indicates its willingness to complete transaction processing. If the terminal or card decides to go online, completion shall be achieved when the second GENERATE AC command is issued.

Payment products, such as pre-authorized or offline-prepaid products, rely on a balance managed by the card and updated by the Issuer. For purpose of these updates, the Issuer needs to be able to send balance update instructions in a trustable and reliable manner to the payment device. The terminal and network infrastructure based on the EMV specifications and provided by EMVCo allows updates as part of an online authorization response and implements three mechanisms for doing so:

Updates prior to the second Generate AC—the so-called critical scripts (tag 71, see EMV specifications)

Issuer Authentication data, sent as part of the second Generate AC (tag 91, see EMV specifications) or in an External Authenticate command (see EMV Specifications)

Updates after the second Generate AC—the so-called non-critical scripts (tag 72, see EMV specifications).

Existing network infrastructure imposes limitations on the size of the updates the issuer can send: for example issuer scripts can be limited to 124 bytes and issuer authentication data can be limited to 16 bytes. This causes an inconvenience to the issuer. In addition, these three methods, using tags 71, 91 and 72 are not linked together giving rise to the possibility of errors. Also if the updates are written to non-volatile memory a problem can occur if the process is aborted prematurely. In that case, the values already written to non-volatile memory must be rolled back to the old values. This can involve storing both sets of values in non-volatile memory and then updating address data to point to one or other of the sets of data depending on the successful or unsuccessful completion of the transaction. It would be preferred if the Issuer Updates could be carried out in a more convenient manner.

SUMMARY OF THE INVENTION

An object of the present invention is to provide a method and system for providing a more flexible and controllable environment for a payment system using a payment device such as an IC card payment system. Another object of the present invention is to provide a method and system for using a payment device capable of utilizing a pre-authorized amount on existing infrastructure, including POS terminals or for using offline pre-paid products on this infrastructure.

An advantage of the present invention is that the updates for the pre-authorized or offline prepaid products can be sent by the issuer and applied by the card contemporaneously with the card's processing of the issuer authentication data but without requiring any additional bytes in the issuer authentication data. Another advantage of the present invention is that the updates performed by the issuer can be larger and more extensive than could be achieved by using any available space in the issuer authentication data.

In an embodiment the present invention provides a method of managing a payment device in a financial transaction between an issuer node and a payment device via a terminal across a payment network, update information of the financial transaction routed through the payment network to the payment device being subject to errors and/or a bandwidth limitation, each financial transaction being routed at an application layer from the issuer node to the terminal, and components of the financial transaction being transferred from the terminal to the payment device, the payment device being issued by an issuer or an agent of the issuer, at least a first component of the financial transaction being delivery of the update information and being transferred by the terminal to the payment device, the at least one first component of the financial transaction requiring at least one operation of recording the update information in non-volatile memory on the payment device conditional on at least a second component of the financial transaction, the second component including an outcome requested by the issuer or the agent of the issuer, said method comprising the payment device executing the steps of:

a) on receiving the update information, provisionally storing the update information on the payment device without losing prior values corresponding to the update information; and b) on receiving the at least one second component, applying the update information to non-volatile memory on the payment device only if the payment device has issued a confirmation that the financial transaction has been completed in accordance with the outcome requested by the issuer or the agent.

Preferably, the applying step is only carried out if the payment device has successfully authenticated instructions from the issuer or the agent in accordance with an authentication process. One way of implementing the confirmation is as an application cryptogram.

To allow efficient processing the outcome requested by the issuer is preferably approval or denial.

The method may also comprise:

(a) providing said payment device with a pre-authorized limit representing the maximum value which may be utilized with said payment device for at least one off-line transaction without communication with said issuer or the agent via said payment network for authorization of said transaction;

(b) storing on said payment device a pre-authorized balance representing the value of transactions conducted with said payment device without on-line communication with said payment network for authorization of said transaction;

(c) utilizing said payment device for conducting said transaction and reading from said payment device said pre-authorized balance, or said preauthorised amount, and an account number associated with an account;

(d) determining to initiate an on-line authorization request in the event the value of said transaction is greater than the difference between said pre-authorized limit and said pre-authorized balance;

(e) in function of step (d), initiating an on-line authorization request by communicating with a payment network; and (f) receiving authorization to conduct said transaction and updating by said payment device said pre-authorized balance and said pre-authorized limit, wherein the issuer, through said payment device, updates the pre-authorized limit.

In embodiments of the present invention it is the issuer, that updates, through said payment device, the pre-authorized balance.

An example of processing is for the payment device to receive a denial prohibiting said transaction. The payment device updates said pre-authorized balance and said pre-authorized limit, wherein the issuer or the agent, through said payment device, is able to update the pre-authorized limit.

Preferably the payment device receives a response code, and the update information is only applied if the application cryptogram is the one defined by the response code. The response code preferably has an indication whether the financial transaction should be declined if the update information was not received or be processed independently of the presence of the update information. Preferably transfers such as of the at least one first and/or second component are made securely from the terminal to the payment device. Securely transfer can include an error detection mechanism or even an error correction mechanism.

Preferably, the update information is calculated assuming the financial transaction has been completed successfully.

This means that after the update is recorded the payment device is up-to-date and a further update mechanism is not required.

Embodiments of the present invention also provide a system for managing a payment device in a financial transaction between an issuer node and a payment device via a terminal across a payment network, update information of the financial transaction routed through the payment network to the payment device being subject to errors and/or a bandwidth limitation, each financial transaction being routed at an application layer from the issuer node to the terminal, and components of the financial transaction being transferred from the terminal to the payment device, the payment device being issued by an issuer or an agent of the issuer, at least a first component of the financial transaction being delivery of the update information and being transferred by the terminal to the payment device, the at least one first component of the financial transaction requiring at least one operation of recording the update information in non-volatile memory on the payment device conditional on at least a second component of the financial transaction, the second component including an outcome requested by the issuer or the agent of the issuer, wherein the payment device is adapted so that:
a) on receiving the update information, the payment device provisionally stores the update information on the payment device without losing prior values corresponding to the update information; and
b) on receiving the at least one second component, the payment device applies the update information to non-volatile memory on the payment device only if the payment device has issued a confirmation that the financial transaction has been completed in accordance with the outcome requested by the issuer or the agent.

Preferably the payment device is adapted to apply the update information only if the payment device has successfully authenticated instructions from the issuer or the agent in accordance with an authentication process. As explained previously the confirmation can be an application cryptogram. The outcome requested by the issuer can be approval or denial.

The system may comprise:
(a) the payment device having stored thereon a pre-authorized limit representing the maximum value which may be utilized with said payment device for at least one off-line transaction without communication with said issuer or the agent via said payment network for authorization of said transaction;
(b) the payment device having stored thereon a pre-authorized balance representing the value of transactions conducted with said payment device without on-line communication with said payment network for authorization of said transaction;
(c) means for reading from said payment device said pre-authorized balance, or said preauthorised amount, and an account number associated with an account;
(d) means for determining to initiate an on-line authorization request in the event the value of said transaction is greater than the difference between said pre-authorized limit and said pre-authorized balance;
(e) the means for determining, in function of step (d), being adapted to initiate an on-line authorization request by communicating with a payment network; and
(f) means for receiving authorization to conduct said transaction and for updating by said payment device of said pre-authorized balance and said pre-authorized limit, wherein the issuer, through said payment device, updates the pre-authorized limit.

In such a case, the issuer, through said payment device, updates the pre-authorized balance.

Further, the payment device may be adapted to receive a denial prohibiting said transaction and an update is carried out by said payment device of said pre-authorized balance and said pre-authorized limit, wherein the issuer or the agent, through said payment device, is able to update the pre-authorized limit.

Preferably the payment device is adapted to receive a response code, and the update information is only applied if the application cryptogram is the one defined by the response code. This response code can have an indication whether the financial transaction should be declined if the update information was not received or be processed independently of the presence of the update information.

Either a wireless or a wired connection between the terminal and the payment device is preferably adapted such that the at least one first and/or second component is transferred securely from the terminal to the payment device. Such a connection for securely transferring can include an error detection mechanism.

Preferably, the system is adapted to calculate the update information assuming the financial transaction has been completed successfully.

The present invention also provides a payment device having volatile and non-volatile memory, the payment device being for use in a financial transaction between an issuer node and the payment device via a terminal across a payment network, the payment device being adapted to process each financial transaction delivered at an application layer from the issuer node to the terminal, whereas components of the financial transaction are transferred from the terminal to the payment device, the payment device being issued by an issuer or an agent of the issuer, at least a first component of the financial transaction being delivery of update information and being received by the payment device from the terminal, the at least one first component of the financial transaction requiring at least one operation of recording the update information in non-volatile memory on the payment device conditional on at least a second component of the financial transaction, the second component including an outcome requested by the issuer or the agent of the issuer, wherein the payment device is adapted so that:
a) on receiving the update information, the payment device provisionally stores the update information on the payment device without losing prior values corresponding to the update information; and
b) on receiving the at least one second component, the payment device applies the update information to non-volatile memory on the payment device only if the payment device has issued a confirmation that the financial transaction has been completed in accordance with the outcome requested by the issuer or the agent.

The present invention provides a system and methods for conducting a financial transaction using a payment device such as an integrated circuit device issued by a card issuer, associated with an account and capable of conducting off-line and on-line transactions with a payment card network. The method includes providing the integrated circuit device with a pre-authorized limit representing the maximum value which may be utilized with the payment device for at least one off-line transaction without communication with the payment network for authorization of the transaction, and storing on the integrated circuit device a pre-authorized balance representing the value of transactions conducted with the card without on-line communication with the payment network for authorization of the transaction. The method also includes utilizing the card for conducting the transaction and reading from the card the pre-authorized balance, or said preauthorised amount, and an account number associated with the account. The method further includes determining to initiate an on-line authorization request in the event the value of the transaction is greater than the difference between the pre-authorized limit and the pre-authorized balance and if it is determined that an online authorization is necessary, initiating an on-line authorization request by communicating with the payment network. Finally, the method includes receiving authorization to conduct the transaction and updating by the card of the pre-authorized balance or the pre-authorized limit, wherein the card issuer, through the payment device such as the integrated circuit device, is able to update the limits. The update may take place continually or occasionally after each on-line transaction and a new limit may be set as a function of the transaction, account use, and/or account balance. Alternatively, the update may take place at the customer's request. In accordance with embodiments of the present invention a method is provided of modifying the content of memory of a payment device having volatile and non-volatile memory, wherein the payment device is temporarily coupled to a terminal while a financial transaction is being executed, the financial transaction including the terminal applying commands to the payment device, at least one command requiring at least one operation of recording in non-volatile memory on the payment device, a data item designated by the command, said method comprising the payment device executing the steps of:

1) on receiving an update command from the terminal comprising update information, modifying the contents of volatile memory on the payment device by provisionally recording in the volatile memory the update information without losing prior values in non volatile memory corresponding to the update information; and
2) applying the update information to non-volatile memory on the payment device only if the payment device has completed the financial transaction.

Preferably the update is applied only if:
a) the payment device has been successfully authenticated in accordance with an authentication process, and
b) the payment device has issued a message that the transaction is complete.

The message can be a cryptogram that confirms that the financial transaction has been completed with the outcome requested by the issuer, e.g. approval or decline.

The present invention also provides a payment device such as an integrated circuit device for conducting an off-line and on-line financial transaction. The payment device such as an integrated circuit device is issued by a card issuer, associated with an account and capable of conducting off-line and on-line transactions with a payment network.

The payment device such as an integrated circuit device includes a memory unit and a processing unit. The memory unit includes non-volatile and volatile memory. The non-volatile memory stores a pre-authorized balance, which represents the current accumulated value of transactions authorized and a pre-authorized limit, which represents the ceiling that the pre-authorized balance may not exceed and an account number associated with the account. The card issuer establishes the pre-authorized limit which represents the maximum value which may be utilized with the payment device for at least one off-line transaction without communication with the payment network for authorization of the transaction. The pre-authorized balance represents the value of transactions conducted with the payment device without on-line communication with the payment network for authorization of the transaction. The processing unit is in communication with the memory unit. The processing unit is responsive to a request to purchase at least one good or service. Receipt of the request causes the processing unit to read the pre-authorized balance, pre-authorized limit, and account number from the memory unit. The processing unit determines whether to initiate an on-line authorization request in the event the value of the transaction is greater than the difference between the pre-authorized limit and the pre-authorized balance. If the processing unit determines that an on-line authorization request is necessary, an on-line authorization request is issued by communicating with the integrated circuit device using the payment network. In response to the request, the processing unit may receive authorization to conduct the transaction and update the pre-authorized balance and the pre-authorized limit, wherein the issuer, through the processing unit, is able to update the pre-authorized limit.

BRIEF DESCRIPTION OF THE DRAWING

Further objects, features and advantages of the invention will become apparent from the following detailed description taken in conjunction with the accompanying figures showing illustrative embodiments of the invention, in which.

Figure 1A:
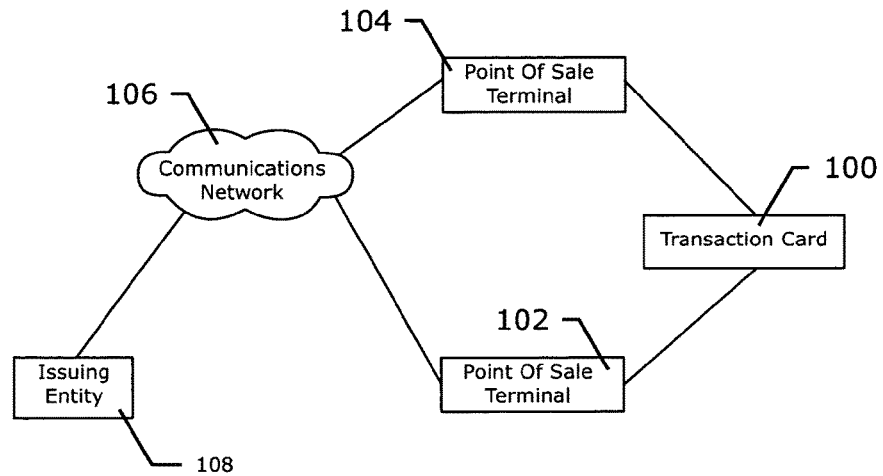
FIG. 1A is a diagram of the interacting components of a system according to an exemplary embodiment of the present invention.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

Definitions

The following abbreviations may be used in the description of the present invention.

| Abbreviation | Description |
| --- | --- |
| AAC | Application Authentication Cryptogram |
| AC | Application Cryptogram |
| AID | Application Identifier |
| APDU | Application Protocol Data Unit |
| ARPC | Authorization Response Cryptogram |
| ARQC | Authorization Request Cryptogram |
| ATeC | 1st 2 bytes of the Additional Terminal Capabilities |
| b | Binary |
| BCD | Binary Coded Decimal |
| C-APDU | Command APDU |
| CDA | Combined DDA/Application Cryptogram Generation |
| CDOL | Card Risk Management Data Object List |
| CIAC | Card Issuer Action Code |
| CLA | Class |
| CRM | Card Risk Management |
| CVM | Cardholder Verification Method |
| CVR | Card Verification Results |
| DDA | Dynamic Data Authentication |
| DOL | Data Object List |
| EEPROM | Electrically Erasable Programmable Read Only Memory |
| EMV | Europay MasterCard ® Visa |
| FCI | File Control Information |
| ICC | Integrated Circuit Card |
| INS | Instruction |
| MAC | Message Authentication Code |
| PAN | Primary Account Number |
| PDOL | Processing Options Data Object List |
| PIN | Personal Identification Number |
| RFU | Reserved for Future Use |
| R-APDU | Response APDU |
| SFI | Short File Identifier |
| SW12 | Status Word bytes 1-2 |
| TC | Transaction Certificate |
| TLV | Tag Length Value |
| TVR | Terminal Verification Results |

"Payment device" may be a credit card or debit card. It preferably comprises a smartcard or is any device that has an embedded processing engine and memory such as a microchip. A smartcard is generally defined as a card (or other form of portable payment device) that has embedded in it a processing engine such as a microprocessor, and one or more solid state memories, or has embedded therein one or more solid state memories with non-programmable logic circuits. The solid state memories may be volatile or non-volatile memories. It is preferred if the payment device has both volatile and non-volatile memory. The processing engine can implement certain processing functions, such as to perform arithmetical operations, i.e. manipulate data stored in a solid state memory on the card. Smartcards can execute functions such as obtaining authentication from a remote site, encryption, storing and manipulating data, etc.

A "smartcard" can be a contact card or a contactless card. A "contact card" has a means for storing information such as a microchip that can be contacted and read by a card reader through a physical contact of electrodes. A "contactless card" can communicate without the need for direct physical contact. Contactless cards can have a means for communicating at radio frequencies. A contactless card is also provided by a portable device such as a mobile phone or personal digital assistant (PDA) in which a smartcard such as a "SIM card" is embedded. The mobile device provides the RF technology for communication. A contactless card may be defined by a standard such as ISO 14443. A "smartcard" can also have both a contact and a contactless interface and can therefore be used as both a contact and a contactless card.

A "script" refers to a command or instruction that, when supplied to the payment device, results in execution of a payment application installed on the payment device. A script may be used to set, reset, activate or deactivate, configure or reconfigure a function of the payment application or of the payment device such as a counter stored in a memory.

"Data"—the present invention involves manipulation of data. Data can be transient or persistent data. Data is transient when it is lost after power is removed and has a lifespan limited to a single transaction. Some examples are: the Card Verification Results (CVR) and the PIN Verification Status (PVS).

Data is "persistent" when it is stored in memory that provides long-term retention (such as EEPROM) and when the data has a lifespan beyond a single transaction.

Persistent data can be common to both contact and contactless interfaces or interface specific.

A "pre-authorized balance" is an amount or value which the cardholder has so far used.

A "pre-authorized limit", is the total amount or value which the cardholder can use which is "pre-authorized" or does not have to be subject to an on-line authorization request.

A "pre-authorized amount" relates to the difference between the "pre-authorized balance" and the "pre-authorized limit". Purchases by the cardholder valued under this amount may take place "off-line" (i.e. without the need to go on-line for authorization).

A "payment network" is a type of network that typically includes an issuer node such as an issuer server, and a terminal or more usually a plurality of terminals connected in the payment network e.g. by wireless or wired connections. Terminals can be POS terminals, merchant terminals, bank terminals, home computers, PDA, laptops, cell phones or mobile phones etc. Transmission across the network is subject to errors and/or a bandwidth limitation, in particular the present invention relates to networks in which update information of a financial transaction routed through the payment network to a payment device is subject to a bandwidth limitation. This bandwidth limitation can be due to the protocol that governs how a payment transaction is transmitted across the network. For example, the protocol may only allow a certain bit or byte size for certain messages such as those containing update information. In a payment network each financial transaction is routed at an application layer from the issuer node to the terminal. Components of the financial transaction are transferred from the terminal to the payment device. One component of the financial transaction delivered to the payment device is update information. The update information for the payment device is recorded in non-volatile memory on the payment device. The payment network may use message switching rather than packet switching. A financial transaction is then transferred as a message which is routed in its entirety and as a separate entity. Each message contains addressing information, and at each node or switch of the network this information is read and the transfer path to the next node or switch is decided. Typically each message is stored (usually on hard drive due to RAM limitations) before being transmitted to the next node or switch. Hence the payment network could be a 'store-and-forward' network.

DETAILED DESCRIPTION OF THE INVENTION

Embodiments of the present invention relate to systems, apparatuses and methods for performing payment transactions, and more specifically, to a systems, apparatuses and methods for performing payment transactions using a payment device that can be used with a contactless or contact payment device which has a contact or contactless communication interface. An example of a contactless interface is that provided by an integrated circuit chip embedded in a wireless mobile device. A contact interface can be provided by a payment card having an integrated circuit chip that can be inserted into card reader, e.g. at a point of sale terminal, and read by physical contact with electrodes. Embodiments of the invention may be used to conduct payment transactions and to perform Issuer Updates of data stored in a payment device.

The present invention relates to technical solutions to address the problem of limited resources on payment networks, especially existing payment networks. Existing payment networks have resource limitations because they impose limitations on the size of the updates the issuer can send through the network. This resource limitation can be that the size of issuer scripts is limited, e.g. limited to 124 bytes and/or the size of issuer authentication data is limited e.g. limited to 16 bytes. This or these resource limitation(s) also applies/apply to the connection between the terminal and the payment device with which it is communicating.

Also the payment network and the connection between the terminal and the payment device with which it is communicating are subject to errors. The present invention addresses the issue that when the updates are written to non-volatile memory, a problem does not occur should the process be aborted prematurely. The present invention provides technical solutions that avoid storing multiple sets of update values in non-volatile memory. Nor does the present invention require pointing to one or other of a plurality of sets of data depending on the successful or unsuccessful completion of the transaction.

In accordance with the system and methods of the present invention, a consumer can use a transaction card to make purchases at a point of sale ("POS") terminal. The present invention will mainly be described with reference to a financial transaction such as a purchase transaction using a pre-authorized balance, defined as an amount or value which the cardholder has so far used and a pre-authorized limit, defined as the amount or value which the cardholder can use which is "pre-authorized" or does not have to be subject to an on-line authorization request which would seek authorization for the transaction through a payment card system (such as the MasterCard® network) from the issuer bank (i.e. the bank which issued the card). Purchases by the cardholder valued under the difference between the "pre-authorized balance" and the "pre-authorized limit" called the "pre-authorized amount" may take place "off-line" (i.e. without the need to go on-line for authorization). The non-volatile memory on the payment device stores the current balance, which represents the current accumulated value of transactions authorized and a pre-authorized limit, which represents the ceiling that the balance may not exceed and an account number associated with the account.

Each of the at least one POS terminals (which could be a personal computer, a personal digital assistant, cell phone, or the like) has a processor, interface hardware, and interface software configured to interact with the payment device such as a transaction card. If not embedded in the interface hardware, the POS terminal may have a separate card reader. Also part of the system are external networks for transmitting over communication lines financial and banking information. The present invention facilitates the purchase of goods and services at a POS terminal without using paper currency by utilizing a pre-authorized amount derived from the pre-authorized limit and the balance for which can be modified online as specified below.

The transaction card is preferably an integrated circuit ("IC") card (also called a "smartcard"), which is typically the size of a conventional credit card, but which contains a processing engine such as a microprocessor, and memory. The card can be used to perform financial transactions in various modes. In the preferred embodiment, the payment device such as the IC card can perform credit, debit, pre-authorized amount or electronic cash card functions, or a combination of the four, that allow a cardholder to make purchases. Transaction data can also be recorded on the card.

The system, as illustrated in FIG. 1A, preferably includes a payment device such as a transaction card 100, POS terminals 102, 104, a communications network 106 and an issuing entity 108, each of which will now be briefly described. The payment device such as the transaction card 100 includes a payment application which allows the payment device such as the transaction card 100 to carry out financial transactions as a credit card, a debit card, a pre-authorized amount card or an electronic cash card, as described in greater detail below. Each of the POS terminals 102, 104 execute a POS terminal application, which may be integrated with an electronic reader such as a card reader. In particular, the reader reads information stored in the payment device such as the transaction card 100, and the POS terminal 102, 104 acts upon the received information, also as described in greater detail below. The communications network 106 allows the POS terminals 102, 104 to communicate through a payment network (defined above but not shown) with the issuing entity 108. The communications network 106 carries information from the POS terminals 102, 104 through the payment network to the issuing entity 108 detailing sale transactions occurring at the POS terminals 102, 104 and/or sales transactions stored on the payment device such as the IC card 100, and from the issuing entity 108 back through the payment network to the POS terminals 102, 104 and consequently the payment device such as the transaction card 100 approving or denying the sale transactions, as described below.

In an alternate embodiment, an agent (not shown) of the issuing entity 108, acting on behalf of the issuing entity 108, may communicate with the communications network 106 without involving the issuing entity 108 directly in the transaction.

Preferably, the communications network 106 is a telecommunication network and/or private network. The issuing entity 108 controls the ability to replenish or renew the pre-authorized amount. The pre-authorized amount as used in this application is the difference between the "pre-authorized limit" (i.e. the maximum amount initially set by the issuer which the user can cumulatively spend using the card without going on-line and communicating with the issuer) and the "pre-authorized balance" (i.e., the amount actually spent by the cardholder without going on-line and communicating with the issuer). The pre-authorized amount therefore preferably includes a pre-authorized balance field and a pre-authorized limit field, as well as an issuing country field and/or a currency field. The issuing entity 108 maintains an underlying account which supports any use of the pre-authorized amount. Preferably, the underlying account will have a positive balance at least equal to the maximum amount of the pre-authorized amount before authorizing a replenishment or renewal of the pre-authorized amount or updating the pre-authorized limit or balance.

Figure 1B:
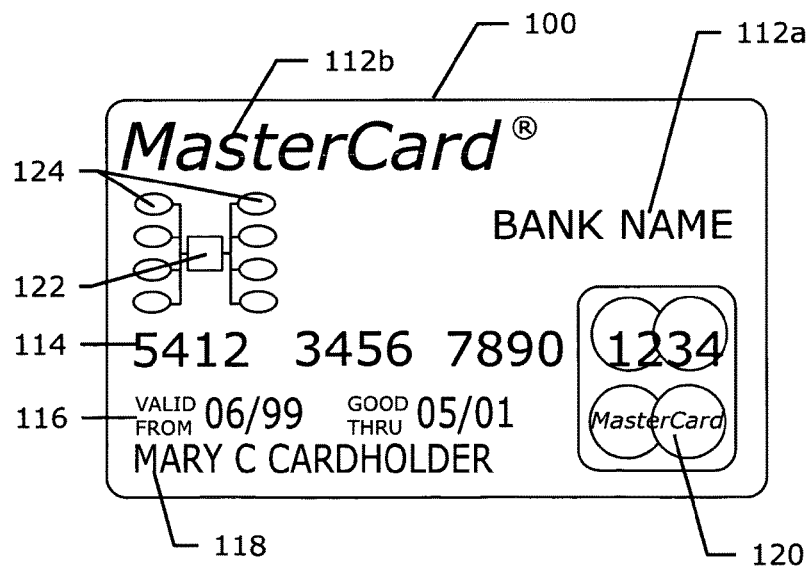
FIG. 1B is a diagram of a transaction card incorporating integrated circuit technology according to an exemplary embodiment of the present invention.

FIG. 1B illustrates one type of payment device such as a transaction card 100. The transaction card 100 incorporates integrated circuit technology into a conventional credit card. The transaction card 100 looks similar to a conventional credit card, but also includes an integrated circuit ("IC") 122, which contains a microprocessor, and electrical contacts 124 for communications between the IC 122 and devices external to the transaction card 100. The transaction card 100 can be used as a credit card and/or a debit card. If used as a credit card or a debit card, a pre-authorized amount may be used to augment the functionality of the credit card or debit card. Similar to a conventional credit card, the front side of the transaction card 100 preferably contains the name 112a of a financial institution that issues the card and/or the name 112b of a payment system (e.g. MasterCard®) under whose authority the card is issued, a cardholder's account number 114, the cardholder's name 118, dates 116 between which the card is valid and usable, and a brand 120 associated with the payment system.

In an alternate embodiment, the transaction card 100 may be replaced by an integrated circuit device. The integrated circuit device may have a form factor different than that of the transaction card 100. The integrated circuit device can be a mini-card, a key fob, a contactless IC card, and the like. The integrated circuit device includes the IC 122, which may not be visible. The integrated circuit device may not include the other elements of the transaction card 100. The integrated circuit device may utilize electrical contacts 124 for communications between the IC 122 and devices external to the integrated circuit device. Alternatively, the integrated circuit device may utilize different modes of communication with external devices including radio frequency communication and induction field communication.

In an alternate embodiment, the transaction card 100 may be replaced by a mobile wireless device such as a mobile phone, smartphone, PDA etc. that contains an integrated circuit device.

Figure 2:
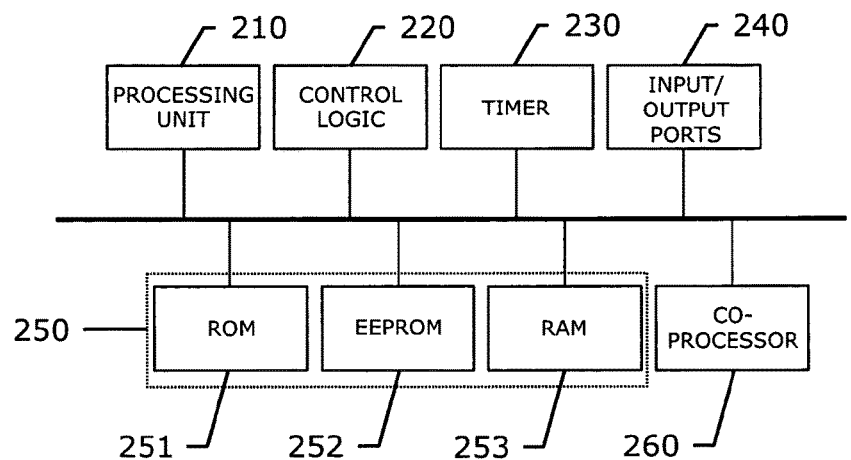
FIG. 2 is a functional block diagram of the integrated circuit section of the card illustrated in FIG. 1B according to an exemplary embodiment of the present invention.

FIG. 2 is a functional block diagram of an integrated circuit device that can be included in the payment device such as the IC 122 and contains at least processing unit 210 and memory unit 250. Preferably, the IC 122 also includes control logic 220, a timer 230, and input/output ports 240. The IC 122 can also include a co-processor 260. Control logic 220 provides, in conjunction with processing unit 210, the control necessary to handle communications between memory unit 250 and the input/output ports 240. The timer 230 provides a timing reference signal to processing unit 210 and control logic 220. Co-processor 260 provides the ability to perform complex computations in real time, such as those required by cryptographic algorithms.

Memory unit 250 may include different types of memory, such as volatile and non-volatile memory and read-only and programmable memory. Memory unit 250 stores transaction card data such as secret cryptographic keys and optionally a user's personal identification information such as a Personal Identification Number ("PIN"). Other forms of personal identification information can be stored such as biometric data. The secret cryptographic keys may be generated by any type of well-known cryptographic algorithm, such as the private keys of public-private key pairs. Preferably, the secret cryptographic keys and optionally the user's personal identification information such as a PIN or biometric are stored in a secure area of ROM or EEPROM that is either not accessible or has very limited accessibility from outside the payment device such as the IC card.

Memory unit 250 stores the operating system of the IC card. The operating system loads and executes IC card applications and provides file management or other basic card services to the IC card applications. One operating system that can be used to implement the present invention is the MULTOS™ operating system licensed by MAOSCO Ltd. Preferably, the operating system is stored in ROM 251.

In an alternate embodiment, flash memory or other non-volatile and/or volatile types of memory may also be used in the memory unit 250.

In addition to the basic services provided by the operating system, memory unit 250 may also include one or more IC card applications. For example, a MasterCard® M/Chip or M/Chip Advance application or a similar Credit/Debit application could be stored on card 100. Additionally, if the IC card is to be used as an electronic cash card, the MONDEX™ electronic cash application might be included on the IC card, which electronically loads onto the IC card a value of a certain currency from a cardholder's account in a financial institution. An application may include both program and data files, which may be stored in either ROM or EEPROM.

Preferably, the memory unit 250 includes the payment application, the pre-authorized balance field, the pre-authorized limit field, and the like. The payment application can configure the transaction card 100 to behave like a credit card, a debit card, a pre-authorized amount card or a cash card. As stated above, the pre-authorized amount can be derived from values in the pre-authorized balance field and the pre-authorized limit field. The pre-authorized limit field is preferably specified by the issuing entity. The pre-authorized balance field contains a number indicating the accumulated amount of money spent off-line at any particular point in time. The issuing country field, which is not specifically associated with the pre-authorized amount, includes a country code which is indicative of the country within which the transaction card was issued.

Figure 3:
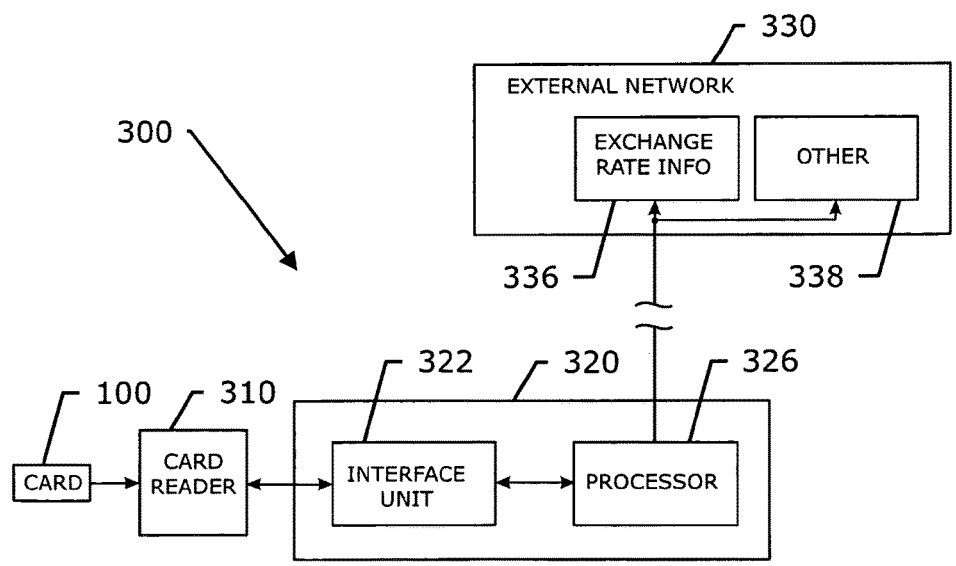
FIG. 3 is a block diagram of a part of the system of FIG. 1A using the transaction card of FIG. 1B according to an exemplary embodiment of the present invention.

FIG. 3 is a block diagram of a system 300 for reading information from the IC card. System 300 includes a terminal 320. The term "terminal" generically describes devices with which the payment device such as an IC card may communicate such as a kiosk-type interface terminal, a personal computer, a PDA, a mobile device, or a POS terminal, etc.

Within terminal 320 are interface unit 322 and processor 326. Interface unit 322 may consist of a combination of hardware and software, including a display screen, designed to communicate with a cardholder, and buttons keypads, or keyboards with which a cardholder inputs data to the terminal. Interface unit 322 may also include a card reader into which the cardholder inserts card 100 in order to exchange data. Alternatively, the card reader could be external to interface unit 322 as shown by card reader 310. Processor 326 communicates with interface unit 322 and processes the commands and data provided to the terminal by the cardholder. Processor 326 also communicates with devices outside of the terminal and not directly accessible to the cardholder such as external network 330. This communication can be accomplished, for example, using standard short-distance and long-distance communication networks such as local-area and wide-area networks, or via telephone-based or wireless communication lines or dedicated transmission lines. The external network 330 may allow the terminal 320 to communicate with an exchange rate information computer 336, and the like. Terminal 320 can be located in a store or other commercial establishment that accepts card 100 for the purchase of goods and services. Processor 326 can communicate with devices external to terminal 320 such as credit or debit card processing networks (not shown), to which credit, debit or pre-authorized amount card information can be sent and verification for the purchase can be received. This communication can be accomplished using conventional credit and debit card processing methods.

In a preferred embodiment, the pre-authorized amount of the transaction card 100 can be altered, i.e. increasing or decreasing the pre-authorized amount, at specified locations by transferring money to or from the pre-authorized amount of the transaction card 100 through use of a payment terminal, or through use of an ATM, or through use of a banking application executing on a computer, or through use of a banking application executing on a PDA, or through use of a banking application executing on a mobile device, etc.

The request for alteration of the pre-authorized amount can happen at the same time as a purchase transaction or independent from a purchase transaction at a time different from a purchase transaction.

Figure 4:
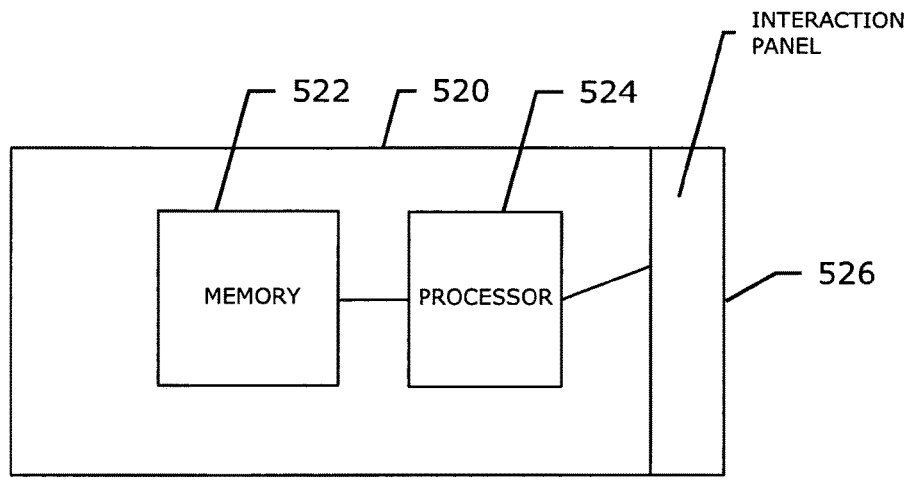
FIG. 4 is a functional block diagram of a terminal according to an exemplary embodiment of the present invention.

FIG. 4 is a block diagram of a transaction terminal. Each terminal 520 includes processor 524, connected to both memory 522 and interaction panel 526. Interaction panel 526 includes the display screens, the buttons with which menu options are chosen, the keypad or keyboard, the card receptacle or the card reader, the receipt dispenser or printer, and the refund dispenser. Processor 524 processes, controls, and outputs data to interact with the user via interaction panel 526. Processor 524 also controls memory 522 which stores dynamic information such as the options chosen by the cardholder during the current session and optionally the cardholder personal identification information such as the PIN, and static information such as transaction history.

Figure 5:
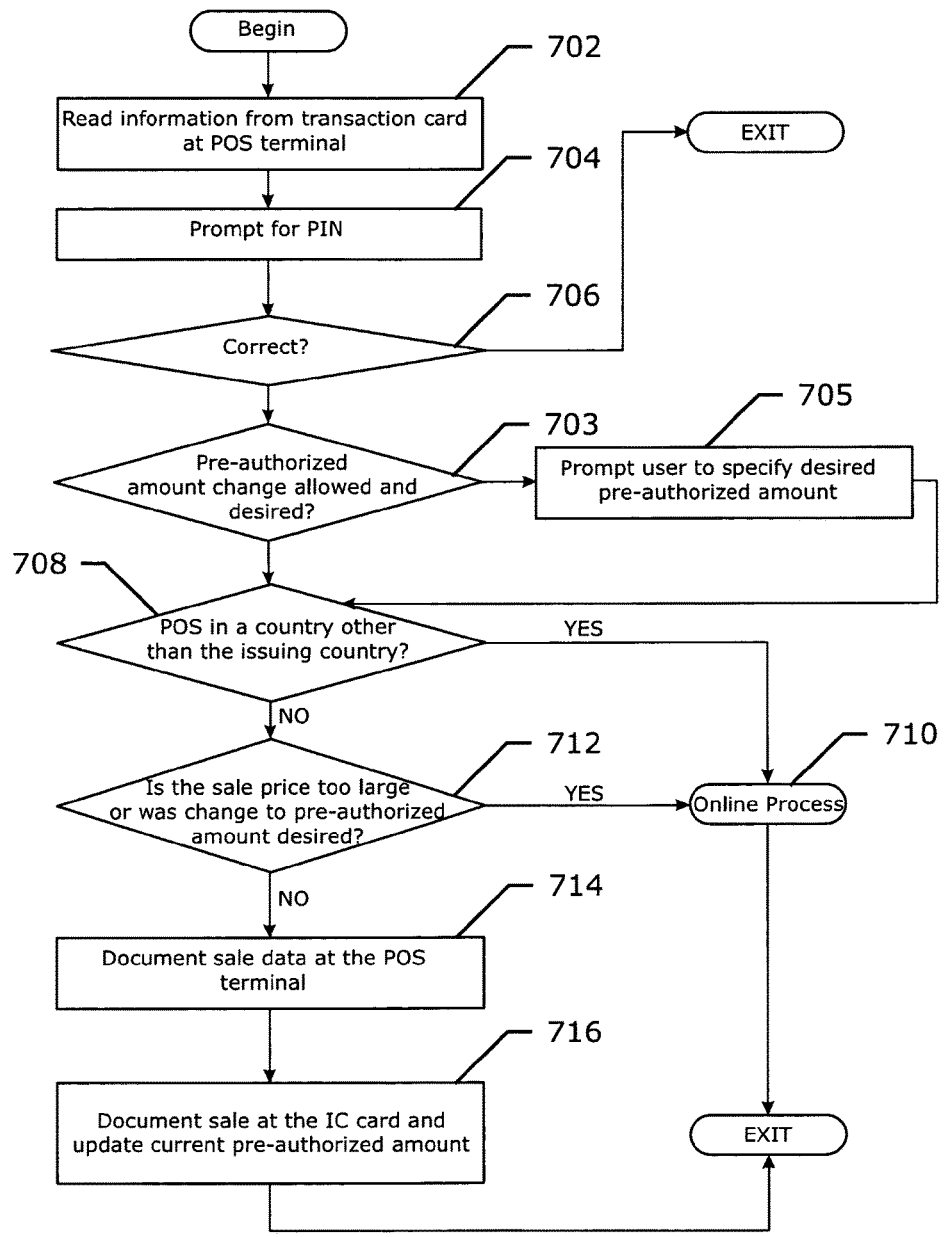
FIG. 5 illustrates a process whereby a point of sale terminal accesses data located within the transaction card necessary to conclude a transaction according to an exemplary embodiment of the present invention.

FIG. 5 illustrates a process 700 whereby the transaction card 100 conducts a financial transaction with the POS terminal 102. The process 700 will be described with reference to POS terminal 102, however alternate POS terminals, including POS terminal 104, may also be used. The process 700 begins at step 702 when the transaction card 100 is used at the POS terminal 102 to purchase goods or services having a predetermined monetary value. At step 702 the POS terminal reads information from the card such as the account number (PAN) and CVM List etc.

The process 700 advances to step 704.

Step 704 is optional. The transaction card 100 instructs the POS terminal 102 to prompt the customer, sometimes referred to as a card holder, for a personal identification such as a PIN. Once the customer specifies the personal identification information such as the PIN, the process 700 advances to step 706. In an alternate embodiment, a cardholder verification method other than the use of a PIN may be utilized, including use of other personal identification mechanisms such as a biometrics mechanism, password and the like. Alternatively no personal identification entry is required.

Step 706 is optional. The transaction card 100 determines if the specified personal identification such as a PIN is correct. If the transaction card 100 determines that the personal identification such as a PIN is correct, the process 700 advances to step 703. If the PIN is not correct, the process 700 exits by declining the transaction.

At step 703, if the POS terminal 102 is capable of altering the pre-authorized amount upon receiving a customer request, the POS terminal 102 prompts the customer to determine if the customer would like to alter the pre-authorized amount currently on the transaction card 100. If the customer wants to alter the pre-authorized amount, the process 700 advances to step 705. If the POS terminal 102 is incapable of altering the pre-authorized amount upon receiving a customer request or if the POS terminal 102 is capable of doing so and the customer does not wish to alter the per-authorized amount, the process 700 advances to step 708.

At step 705, the POS terminal 102 prompts the customer for a requested pre-authorized amount. Once the customer specifies the requested pre-authorized amount, the process 700 advances to step 708.

The issuing country field is read by the transaction card 100 in step 708. At step 708, the transaction card 100 determines whether the location of the POS terminal 102 is within the same country as the country indicated by the issuing country field of the transaction card 100. If the country location of the POS terminal 102 is different than the country indicated by the issuing country field, the process 700 advances to the online process step 710. The online process step 710 is described in more detail in relation to FIG. 8. Otherwise, the process 700 advances to step 712.

In an alternate embodiment, the application currency code of the transaction card 100 and the POS currency code may replace the issuing country field of the transaction code 100 and the location of the POS terminal 102, respectively, during the process 700. The balance and limit are read by the transaction card in step 712. The pre-authorized balance field indicates the monetary value currently spent on off-line transactions. The pre-authorized limit field indicates the maximum monetary value allowed to be spent before the transaction card 100 insists on going online to receive additional verification from the issuing entity 108. The pre-authorized limit field will have been set by the issuing entity 108. The issuing country field specifies the country in which the transaction card 100 was issued by the issuing entity 108. At step 712, the transaction card 100 determines whether it should go on-line to complete the transaction. The transaction card 100 goes on-line if the predetermined monetary value of the goods or services the customer wishes to purchase is greater than the difference between the monetary amount of the pre-authorized limit field and the monetary amount of the pre-authorized balance field, in other words, if the sale price is too large. The transaction card 100 will also be asked by the POS terminal 102 to go on-line if the customer indicated that a change in the pre-authorized amount is desired. If the predetermined monetary value of the goods or services is greater than the difference or if the customer indicated a change is desired, the process 700 advances to the online process step 710.

Figure 8:
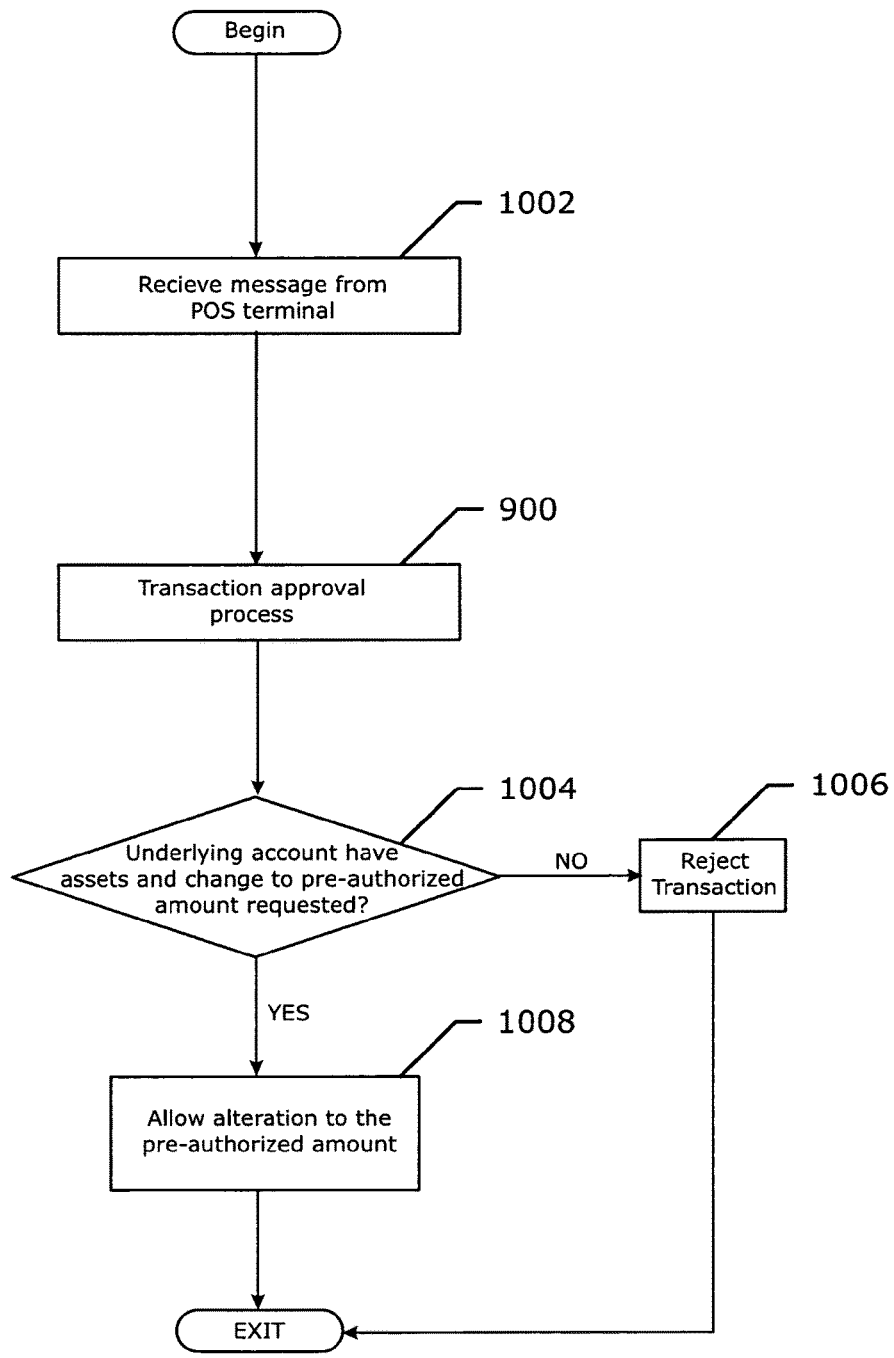

The online process step 710 is described in more detail in relation to FIG. 8. Otherwise, the process 700 advances to step 714.

At step 714, the transaction card 100 begins the completion of the purchase of the goods or services. The transaction card 100 updates the current value of the monetary amount of the pre-authorized balance field on the transaction card 100. The current value of the monetary amount of the pre-authorized balance field is updated by increasing the current value of the monetary amount by the monetary amount charged for the goods or services at the POS terminal 102. Preferably, the transaction card 100 also writes a sales record to a transaction card log file describing the monetary amount authorized for the goods or services, the date, and the currency of the memory unit 250 of the transaction card 100. The transaction card 100 creates a sales record describing the goods or services sold and the monetary amount charged for the goods or services at the POS terminal 102 for subsequent reporting to the issuing entity 108 of the transaction card 100. Once the relevant information is received by the POS terminal, the process 700 advances to step 716.

At step 716, the POS terminal 102 checks the response from the transaction card 100 and creates a sales record describing the goods or services sold and the monetary amount charged for the goods or services at the POS terminal 102 that will subsequently be sent for financial clearing. Once the POS terminal 102 has checked the card's response and logged the sales record for clearing, the process 700 is complete and therefore exits.

In a preferred embodiment, the pre-authorized balance field and the pre-authorized limit field are used in a payment application which is compliant with the EMV Integrated Circuit Card Specification For Payment Systems, v. 4.2 (June 2008). In a preferred embodiment, the pre-authorized balance field and the pre-authorized limit field are used in a payment application which is compliant with the EMV '96, Integrated Circuit Card Specification for Payment Systems, v. 3.1.1 (1998). In still another preferred embodiment, the pre-authorized balance field is the cumulative offline transaction amount, and the pre-authorized limit field is the upper cumulative offline transaction amount of an M/Chip application and the pre-authorized amount is the difference between them returned upon request by the card as the offline balance.

Figure 6:
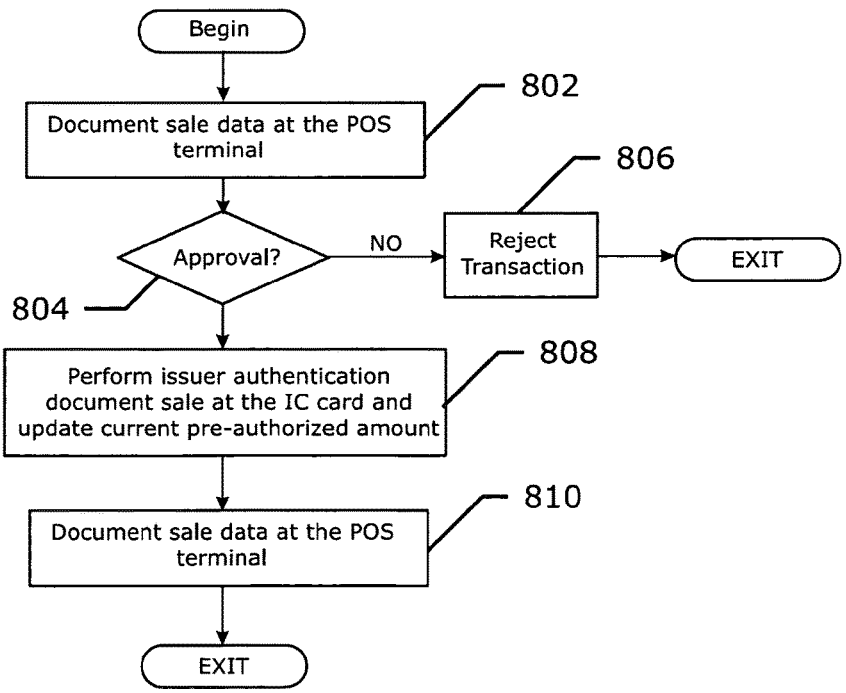
FIG. 6 illustrates a process whereby the point of sale terminal provides a personal identification number to the transaction card in order to have the transaction card approve a transaction according to an exemplary embodiment of the present invention.

FIG. 6 illustrates a process 710 whereby the transaction card 100 determines whether the issuing entity 108 will extend an additional balance to the transaction card 100 to enable the customer to utilize the transaction card 100 to purchase the goods or services and optionally enable the customer to use the transaction card 100 in other off-line purchases by authorizing an additional monetary amount, whether customer requested or not, for the pre-authorized amount. At step 802, the transaction card 100, through the POS terminal 102, sends the issuing entity 108 a message requesting an authorization of a pending purchase transaction and potentially an increase in the current monetary amount of the pre-authorized amount of the transaction card 100. The message sent from the transaction card 100 includes the cardholder's account number 114, the monetary value of the at least one good or service which may also be zero, and either the current value of the pre-authorized balance field plus the current value of the pre-authorized limit field or the current value of the pre-authorized amount, the requested pre-authorized amount, the country code of the issuing country field and the country code representing the country in which the POS terminal 102 is located. Also included in this transmission to the issuing entity 108 is an authorization request cryptogram. Once the transaction card 100 transmits the appropriate information to the issuing entity 108 of the transaction card 100, the process 710 advances to step 804.

At step 804, the transaction card 100 determines whether the issuing entity 108 of the transaction card 100 approved or declined the pending purchase transaction and/or altered the pre-authorized amount. The transaction card 100 receives a message from the issuing entity 108 through the POS terminal 102 which may include an authorization indicator, an updated pre-authorized balance, an updated pre-authorized limit, and the authorization response cryptogram from the issuing entity 108. Details of the process of updating the transaction card 100 using "Issuer Updates" is given below. If the message received from the issuing entity 108 denies the extension of an additional balance to the transaction card 100, the authorization indicator indicates that the authorization failed. If the issuing entity 108 authorizes the pending purchase transaction, the authorization indicator of the message indicates that the authorization was successful.

Regardless of the authorization indicator, the pre-authorized limit and the pre-authorized balance are updated based on the updated pre-authorized limit and the updated pre-authorized balance, respectively. If the updated pre-authorized balance is not specified, the transaction card 100 does not alter the pre-authorized balance. Further, if the updated pre-authorized balance is specified, the transaction card 100 updates the pre-authorized balance to reflect the updated pre-authorized balance. If the updated pre-authorized limit is not specified, the transaction card 100 does not update the pre-authorized limit. And finally, if the updated pre-authorized limit is specified, the transaction card 100 updates the pre-authorized limit to reflect the updated pre-authorized limit. If the pending purchase transaction is approved, the process 710 advances to step 808. Otherwise, the process 710 advances to step 806.

At step 806, the transaction card 100 in conjunction with the POS terminal 102 informs the customer that use of the pre-authorized amount of the transaction card 100 cannot be used to complete this transaction. Once the transaction card 100 in conjunction with the POS terminal 102 refuses to complete the sale using the pre-authorized amount of the transaction card 100, the processes 710 and 700 exit.

At step 808, the transaction card 100 begins the completion of the purchase of the goods or services using the pre-authorized amount. The transaction card 100 executes the script message sent by the issuer and then updates the records located on the transaction card 100. Details of the process of updating the transaction card 100 using "Issuer Updates" is given below. Script validation is a process where the card uses a shared secret code (between the card and issuer) to validate that a message has arrived at the card unaltered from the message created by the issuer. Using this process to ensure the authenticity of the data, the transaction card 100 updates the current value of the monetary amount of the pre-authorized amount field (or changing the limit or balance) on the transaction card 100. The current value of the monetary amount of the pre-authorized balance field is also updated by increasing the current value of the monetary amount by the monetary amount charged for the goods or services at the POS terminal 102. Preferably, the transaction card 100 also writes a sales record describing the mandatory amount authorized for the goods or services, the date, and the currency to the memory unit 250 of the transaction card 100. Once the current value of the monetary amount of the pre-authorized balance field is updated, the process goes to step 810

At step 810, the transaction card 100 informs the POS terminal 102 that the transaction is complete. The POS terminal 102 creates a sales record describing the goods or services sold and the monetary amount charged for the goods or services at the POS terminal 102. Once the relevant information is recorded by the POS terminal 102, the processes 710 and 700 exit.

In an alternate embodiment, the message from the issuing entity 108 does not include a new pre-authorized balance. The transaction card 100 sets the current value of the pre-authorized balance field to be equal the value of the purchased good or service. In another alternate embodiment, the message from the issuing entity 108 does not include a new pre-authorized balance. The transaction card 100 sets the current value of the pre-authorized balance field to be equal to zero. In yet another alternate embodiment, the message from the issuing entity 108 does not include a new pre-authorized balance and the transaction card 100 does not alter the pre-authorized balance field.

Figure 7:
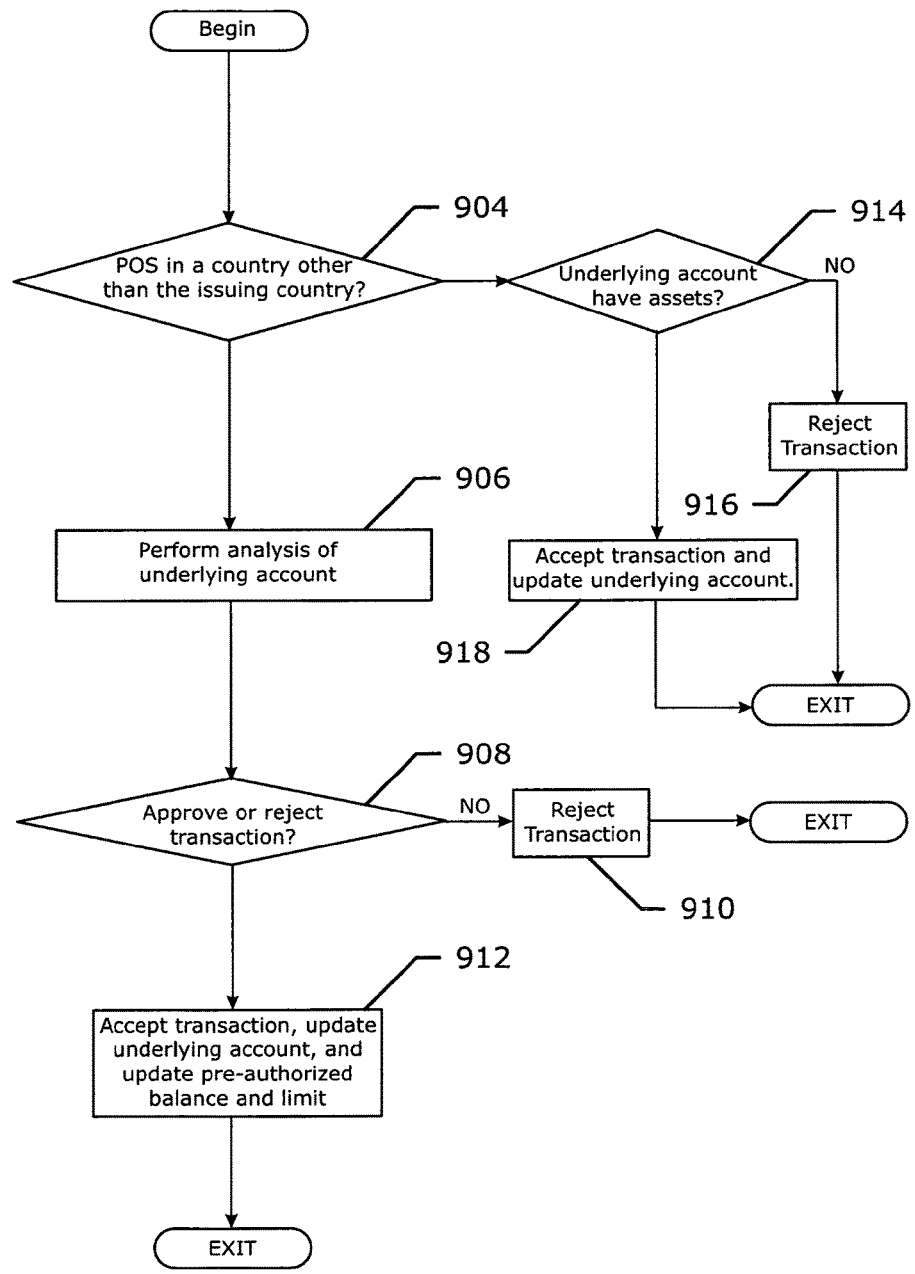
FIGS. 7 and 8 illustrate processes whereby an issuing entity determines whether to authorize or deny a transaction and/or alters the pre-authorized amount according to exemplary embodiments of the present invention.

FIG. 7 illustrates a process 900 whereby the issuing entity 108 determines whether it may authorize a pending purchase transaction. The process 900 begins at step 904 where the issuing entity 108 determines whether the location of the POS terminal 102 is within the same country as the country indicated by the issuing country field of the transaction card 100. If the country code from the POS terminal 102 is different than the country from the transaction card 100, the process 900 advances to step 914. Otherwise, the process 900 advances to step 906.

At step 906, the issuing entity 108 analyzes the underlying account associated with the pre-authorized amount of the transaction card 100 to determine whether an additional pre-authorized amount can be authorized. Increasing the pre-authorized amount may entail approving the transaction which requires more money than the currently authorized pre-authorized amount, and thereafter reducing the pre-authorized amount by adjusting the pre-authorized limit field and the pre-authorized balance field. The pre-authorized amount is determined by calculating the difference between the value stored in the pre-authorized limit field and the value stored in the pre-authorized balance field. The issuing entity 108 utilizes business rules in order to make this determination. An exemplary business rule is that the issuing entity 108 will only increase the effective pre-authorized amount of the transaction card 100 to equal the current monetary amount of the pre-authorized amount plus the negotiable assets currently deposited in the underlying account capped at a maximum amount. Once the issuing entity 108 has performed this analysis on the underlying account, the process 900 advances to step 908.

At step 908, the issuing entity 108 makes the determination as to whether to authorize the request for additional funding of the pre-authorized amount. If the issuing entity 108 determines that the pre-authorized amount can be increased, the process 900 advances to step 912. Otherwise the process 900 advances to step 910.

At step 912, the issuing entity 108 updates an authorization indicator, an updated pre-authorized balance and an updated pre-authorized limit. The issuing entity 108 updates the authorization indicator to reflect the authorization of the pending purchase transaction and updates the underlying account to reflect the additional funding sent to the transaction card 100. The issuing entity 108 also sets the updated pre-authorized balance and the updated pre-authorized limit. The difference between the updated pre-authorized limit and the updated pre-authorized balance is the pre-authorized amount and may be equivalent to the amount of negotiable assets remaining as deposited in the underlying account minus the assets needed to honor the approved transaction, capped at an issuing entity 108 maximum. The underlying account is updated to reflect this pre-authorization and the process 900 exits.

At step 910, the issuing entity 108 updates the authorization indicator, the updated pre-authorized balance, and the updated pre-authorized limit. Details of the process of updating the transaction card 100 using "Issuer Updates" is given below. The issuing entity 108 updates the authorization indicator to reflect the denial of the pending purchase transaction, sets the pre-authorized balance and the pre-authorized limit accordingly and the process 900 exits.

At step 914, the issuing entity 108 analyzes the underlying account associated with the transaction card 100 to determine whether the issuing entity 108 can authorize the transaction. The issuing entity 108 utilizes business rules in order to make this determination. If the issuing entity 108 determines that the transaction can be authorized, the process 900 advances to step 918. Otherwise the process 900 advances to step 916.

At step 916, the issuing entity 108 updates the authorization indicator, the pre-authorized balance and the pre-authorized limit. The issuing entity 108 updates the authorization indicator to reflect the denial of the pending purchase transaction, sets the pre-authorized balance and the pre-authorized limit accordingly and the process 900 exits. Details of the process of updating the transaction card 100 using "Issuer Updates" is given below.

At step 918, the issuing entity 108 updates the authorization indicator, an updated pre-authorized balance and an updated pre-authorized limit. The issuing entity 108 updates the authorization indicator to reflect the authorization of the pending purchase transaction and updates the underlying account to reflect the additional funding sent to the transaction card 100. The issuing entity 108 also sets the updated pre-authorized balance and the updated pre-authorized limit. Details of the process of updating the transaction card 100 using "Issuer Updates" is given below. The difference between the updated pre-authorized limit and the updated pre-authorized balance is the pre-authorized amount and may be equivalent to the amount of negotiable assets remaining as deposited in the underlying account minus the assets needed to honor the approved transaction, capped at an issuing entity 108 maximum. The underlying account is updated to reflect this pre-authorization and the process 900 exits.

In another preferred embodiment, the issuing entity 108 receives a transmission from another terminal, such at an ATM, for an increase in the current monetary amount of the pre-authorized amount.

FIG. 8 illustrates a process 1000 whereby an issuing entity 108 determines whether to authorize or deny a request for additional funding for the pre-authorized amount of the transaction card 100. It should be noted that the issuing entity 108 may be one of MasterCard®, an issuing bank, another financial institution, and the like. The process 1000 begins at step 1002 when the issuing entity 108 receives a transmission from the transaction card 100. The transmission from the transaction card 100 via the POS terminal 102 contains the cardholder's account number 114, the monetary value of the good or service, the current value of the pre-authorized balance field, optionally the current value of the pre-authorized limit field, the requested pre-authorized amount, the country code from the issuing country field of the transaction card 100, and a country code indicating the country in which the POS terminal 102 is located. Also included in this transmission to the issuing entity 108 is an authorization request cryptogram. Once the issuing entity 108 receives this message from the transaction card 100, the process 1000 advances to step 900. At step 900, the issuing entity 108 determines whether it may authorize a pending purchase transaction. Once the issuing entity 108 makes that determination, the process 1000 advances to step 1004.

In an alternate embodiment, the application currency code of the transaction card 100 and the POS currency code may replace the issuing country field of the transaction code 100 and the country code indicating the country in which the POS terminal 102 is located, respectively, during the process 1000.

At step 1004, the issuing entity 108 analyzes the underlying account associated with the transaction card 100 to determine whether the issuing entity 108 can authorize the requested change to the pre-authorized amount if the card holder requested an alteration to the pre-authorized amount. The issuing entity 108 utilizes business rules in order to make this determination. If the card holder requested a change to the pre-authorized amount and the issuing entity 108 determines that alteration of the pre-authorized amount to be equal to the requested pre-authorized amount, as specified by the card holder, can be authorized, the process 1000 advances to step 1008. Otherwise the process 1000 advances to step 1006.

At step 1006, the issuing entity 108 sends a message to the transaction card 100 including the authorization indicator, the updated pre-authorized balance and the updated pre-authorized limit. Once the issuing entity 108 transmits the message, the process 1000 exits.

At step 1008, the issuing entity 108 alters the pre-authorized limit and the pre-authorized balance and sends a message to the transaction card 100. The issuing entity 108 sets the updated pre-authorized limit and the pre-authorized balance such that the difference between the pre-authorized limit and the pre-authorized balance is equal to the requested pre-authorized amount. The issuing entity also updates the underlying account to reflect the alteration to the pre-authorized amount. The issuing entity 108 sends a message to the transaction card 100 including the authorization indicator, the updated pre-authorized limit, and/or the updated pre-authorized balance and the process 1000 exits. Details of the process of updating the transaction card 100 using "Issuer Updates" is given below.

In the above description several transactions have been described in which an update from the issuer is required using a script "Issuer Updates" that is described below. A mechanism is provided by the present invention for use in any of these update processes, i.e. in any of the embodiments of the present invention. The proposed mechanism uses the available bandwidth in scripts (e.g. tag 71) to effectuate updates as if they were part of the issuer authentication data and this without any changes to the existing network infrastructure.

The mechanism relies on the introduction of a script referred to as "ISSUER UPDATES". The script is preferably protected, e.g. with a Message Authentication Code (MAC) for integrity/authenticity as any other script. Issuer Updates Data is received in the ISSUER UPDATES script. The script such as ISSUER UPDATES includes new values to be stored on the card. For example ISSUER UPDATES contains new values of accumulators, counters and limits. The updates are not performed immediately but the values are stored in volatile memory. For example, they will be performed at a time when the transaction has been completed satisfactorily, for example, in the second GENERATE AC. However the update may be subject to additional conditions such as a) provided Issuer Authentication is successful and b) the Application Cryptogram returned is the one requested by the Issuer in the ARPC Response Code. In other words the update values can be provided under the assumption that the transaction is approved, hence these values already have attained the value that they would have if the transaction is completed satisfactorily. But the values are not applied to permanent storage until successful authentication has been confirmed.

The Accumulators And Counters field is of variable length and contains the new values of accumulators, counters and limits. Accordingly, when the ISSUER UPDATES script is executed, the updates are not immediately applied to non-volatile memory on the payment device but rather are stored temporarily in volatile memory. For this purpose the payment device has both non-volatile and volatile memory. The updates are then processed at a later time, e.g. at the end of the $2^{nd}$ Generate AC command, subject to a number of conditions:

Issuer Authentication Data is successfully verified and the card response is according to the Issuer's request (TC or AAC).

Therefore, in accordance with embodiments of the present invention these updates are a deferred, extended Issuer Authentication Data, but sent separately of the $2^{nd}$ Generate AC due to the network and terminal constraints. Given existing network limitations, an advantage of the present invention is that it allows extensive and reliable updates as if they were part of the Issuer Authentication Data.

The present invention provides a single piece of software with an execution path that depends on whether the interface used in a transaction is a contact or contactless interface. The value of some data elements will depend on the interface used and so influence the execution path and the functionality that is supported. "Application Control" is an interface dependent data element that is customized or personalized by the issuer and is used by the present invention for choosing among a plurality of functional options. For example the present invention can have an Application Control for the contact interface and an Application Control for the contactless interface.

The present invention makes use of data elements. Two data elements are accumulators and the counters. In an embodiment the present invention uses two accumulators, referred to as Accumulator 1 and Accumulator 2, and two counters, referred to as Counter 1 and Counter 2.

The data elements associated with accumulators are defined in the Table 1 below

TABLE 1

| Accumulator data organization |
| --- |
| Accumulator Amount (storing value of pre-authorized balance) |
| Accumulator Lower Limit |
| Accumulator Upper Limit |
| Accumulator Currency Code |
| Accumulator Currency Conversion Table |

The data elements associated with counters are defined in Table 2.

TABLE 2

| Counter data organization |
| --- |
| Counter Number |
| Counter Lower Limit |
| Counter Upper Limit |

Each data element of both accumulators and both counters has a tag and is accessible through the GET DATA and PUT DATA command.

Each accumulator has an interface dependant control data element referred to as Accumulator 1 Control and Accumulator 2 Control. Likewise, each counter has an interface dependant control data element referred to as Counter 1 Control and Counter 2 Control. Using these control data elements the accumulators and counters can be assigned to track transactions:
  done over a particular interface (contact or contactless) or
  with or without cardholder verification or
  more generally, in response to an event that was captured in the CVR.

An accumulator or counter can be made dependent on the interface through a simple setting in the corresponding control parameter, defined at personalization or updated via a script.

The dependency on the cardholder verification and the CVR may also be set. There is a separate setting for the cardholder verification dependency and for the CVR dependency and then an additional setting to combine the cardholder verification and CVR dependency. Using this mechanism, an accumulator can be configured to track all transactions, transactions with and transactions without cardholder verification method (CVM) having (a) particular bit(s) set in 1 of the CVR bytes.

An accumulator/counter can be made dependent on the CVM through the setting at personalization of dedicated bits in the accumulator control or counter control parameters of each interface for which the accumulator/counter is active.

Thus, the CVM control setting includes the following options:
  Track any CVM transaction
  Track any transaction without CVM
  Track any transaction The distinction between a transaction with and without CVM is made using the following criterion:
  If the signature or online PIN was performed and the outcome is unknown (in the CVM results) or offline PIN was performed successfully (as per the PIN Verification Status (PVS)) then it is a CVM transaction. Otherwise, it is a no CVM transaction.

The CVR Dependency control setting is a combination of three bytes:
  A reference to the relevant CVR byte; for example '03' means the 3rd byte of the CVR
  A mask to filter out the relevant setting; for example 'F3' means including all bits except for b4 and b3
  A value to compare the filtered CVR byte with; for example '10' means that all bits except b5 should be set to zero.

Using the values from the example above, an accumulator or counter with CVR Dependency control set to '03 F3 10' will be updated if the 3rd byte of the CVR is equal to one of the following values: '10', '14', '18' or '1C'. For this example, assume the value is '1C'.

The steps performed by the card are:
1. Take the value of the '03' byte of the CVR ⇒ '1C'
2. Do a bit-wise AND of this value with 'F3' ⇒ '10'(='1C' AND 'F3')
3. Compare the outcome of the bitwise AND with '10'
Note: It is only the CVR value of the $1^{st}$ GENERATE AC that is taken into account. Updates of the CVR as part of the $2^{nd}$ GENERATE AC are not considered.

Other control settings that influence accumulators and counters are:

Reset on successful offline PIN—if set, the accumulator/counter is reset (to zero) upon successful completion of the VERIFY command.
Note: The reset is not done in the VERIFY C-APDU, but in the 1ST GENERATE AC, after checking the PIN Verification Status (PVS). This makes PVS a security critical element for security evaluation.
Allow reading—if set, the accumulator or counter can be read using the GET DATA command
Include in the Issuer Application Data—if set, the accumulator or counter is included in the Issuer Application Data and therefore included in the authorization and clearing data. An additional setting decides on whether the value included is the accumulator or counter itself or the difference between the upper limit and the accumulator or counter (this is the equivalent of a balance). Another setting whether the value is encrypted or in clear text.

Two important features of counters are:
A counter can be configured so that it is only updated if an accumulator is not updated either update the accumulator or update the counter but not both).
Independent of the currency code, a counter will never be updated if the transaction amount is zero, in the GENERATE AC (Amount, Authorized (numeric)—tag '9F02') command.

The present invention preferably includes a Card Risk Management (CRM) engine, including different checks that are done, the processing based on the Card Verification Results (CVR) and the Card Issuer Action Codes (CIACs).

The Card Risk Management (CRM) engine is designed to conclude with one of three outcomes:
  1. Request for online approval from the issuer
  2. Accept the transaction offline
  3. Decline the transaction offline While the three outcomes are relevant for the $1^{st}$ GENERATE AC, only the last two (accept or decline offline) are relevant for the $2^{nd}$ GENERATE AC.

As part of transaction processing, records are made of the outcome of a number of checks in the Card Verification Results (CVR) and then the CVR Decisional part is compared against the Card Issuer Action Codes (CIACs). The application decides whether to authorize online, accept offline or decline offline based on the value of the CVR and the settings of the CIACs.

The most relevant checks executed by the payment device are listed below:
  Status of the last online transaction, whether it was completed or not
  Indication whether the issuer response in the previous transaction includes issuer scripts, how many, and whether the scripts were correctly processed
  Outcome of the offline PIN processing
  Domestic or international transaction
  Accumulator or counter limit exceeded
  Maximum transaction amount exceeded
  Maximum number of days offline exceeded The Maximum Transaction Amount is activated by means of Application Control. First the application checks whether the Transaction Currency Code from the terminal is equal to the currency code set in the card for this check. If so, the card application compares the transaction amount with one of four limits, according to the interface and the cardholder verification:
  The contact maximum transaction amount with CVM
  The contactless maximum transaction amount with CVM
  The contact maximum transaction amount without CVM The contactless maximum transaction amount without CVM The limits can be accessed using the GET DATA and PUT DATA commands.

The Maximum Number of Days Offline check is activated through Application Control.

The issuer can set the card to go online at regular intervals.

For this purpose, the card has two data elements:
- A checkpoint on the last successful online transaction. Successful means that either Issuer Authentication Data was present and correct OR that the application was configured to accept online transactions without Issuer Authentication Data and received an authorization response code other than "unable to go online".
- A limit indicating the maximum number of days the card can stay offline.

The application will check whether the format of the transaction date is correct and update the CVR accordingly. If the date check fails or if the actual date (received from the terminal) is beyond the checkpoint offset by the limit, then the CVR shows that the card has stayed offline too long.

Both the checkpoint and the limit can be accessed through the GET DATA and PUT DATA command.

The Last Online Transaction Not Completed check is always active and works as follows:
- In the $1^{st}$ GENERATE AC the value of the 'last online transaction not completed' bit in the Previous Transaction History is copied to the CVR.
- If an Authorization ReQuest Cryptogram (ARQC) is generated during the 1st GENERATE AC, then the 'last online transaction not completed' bit in the Previous Transaction History is set to 1b.
- The 'last online transaction not completed' bit in the Previous Transaction History is reset during the $2^{nd}$ GENERATE AC if the transaction is a successful online transaction (i.e. either Issuer Authentication Data is present and correct OR the application is configured to accept online transactions without Issuer Authentication Data and received an authorization response code other than "unable to go online").
- If the transaction is not a successful online transaction, then the 'last online transaction not completed' bit in the Previous Transaction History is set back to its initial value (that is the value at the beginning of the transaction).

The outcome of the different checks is collated in the Card Verification Results (CVR, typically six bytes long). The outcome of each check is logged in the corresponding bit of the CVR.

The resulting CVR is compared against the decision parameters called Card Issuer Action Codes (CIACs). Preferably there are three CIACs-decline, CIAC-online and CIAC-default, each coded on three bytes.

The coding of the CIACs matches the coding of the last three bytes of the CVR (the CVR Decisional Part) and the settings of the CIACs is decided by the issuer. By setting a bit in a particular CIAC, the issuer configures the application to act according to this CIAC for a transaction that sets the corresponding bit in the CVR.

Using this mechanism, the application only has to do a bitwise comparison between the CVR and one of the CIACs. If the same bit is set in both elements, the outcome is decided by this CIAC.

Preferably there are three CIACs per interface:
CIAC-decline: to decline a transaction offline
CIAC-online: to send a transaction online, rather than approving offline.
CIAC-default: to decline a transaction in the absence of an authorization response from the issuer The card risk management is done in the $1^{st}$ GENERATE AC and in the case where the terminal indicates it was unable to go online, in the $2^{nd}$ GENERATE AC.

In the $1^{st}$ GENERATE AC, the terminal can ask for an offline decline (Application Authentication Cryptogram (AAC)), for an offline approval (Transaction Certificate (TC)) or for an online authorization (or ARQC). The card application executes the following:
a) For an AAC request, the card bypasses CRM and delivers an AAC.
b) If the terminal requests an ARQC or a TC, the card checks CIAC-decline first. CIAC-decline typically has those bits set that relate to severe errors, such as PIN Try Limit exceeded. If the CVR and CIAC-decline have at least one bit set in common, the application will decline offline. Otherwise:
   a. If the terminal requests an ARQC, the application will return an ARQC or an AAC. If the terminal requests a TC, the application will check CIAC-default or CIAC-online next. If the terminal is offline-only the card will check against CIAC-default; otherwise it will check against CIAC-online.
    If the card checks against CIAC-online and both CVR and CIAC-online have at least one bit set in common, then the card will return an ARQC. Otherwise, the card will deliver a TC.
    If the card checks against CIAC-default and both CVR and CIAC-default have at least one bit set in common, then the card will decline offline and deliver an AAC. Otherwise, the card will deliver a TC.

In the $2^{nd}$ GENERATE AC, the terminal can ask for an offline decline (AAC) or an offline approval (TC). The card application executes the following sequence:
1. For an AAC request, the card bypasses CRM and delivers an AAC.
2. If the terminal requests a TC, the card will base its risk management on the issuer's authorization response, except if the terminal indicates it was unable to go online:
   If the terminal was able to go online the card approves the transaction and delivers a TC if all of the following are true:
    1. The issuer approved the online authorization request.
    2. Issuer Authentication Data is present and correct or the application is configured to accept online transactions without Issuer Authentication Data.
    3. If Issuer Updates were required by the issuer, as indicated by a flag being set by the issuer in the Issuer Authentication Data, that they were successfully received by the card.
   If the terminal was unable to go online, the card checks the CVR with CIAC-default. If the CVR and CIAC-default have at least one bit set in common, the application will decline. Otherwise, the application will approve the transaction and delivers a TC.

Figure 9:
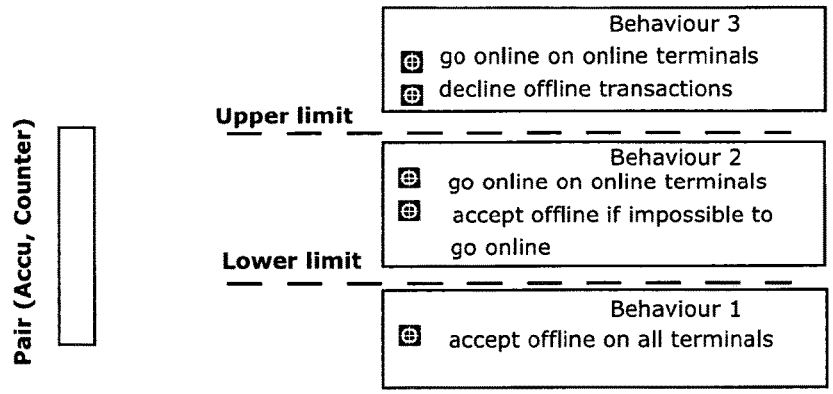
FIG. 9 illustrates a standard mode processing according to an exemplary embodiment of the present invention.
Figure 10:
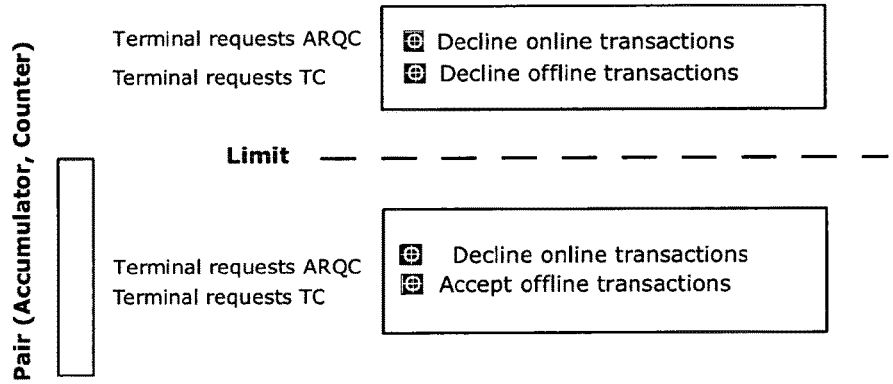
FIG. 10 illustrates an offline only mode of processing according to an exemplary embodiment of the present invention.
Figure 11:
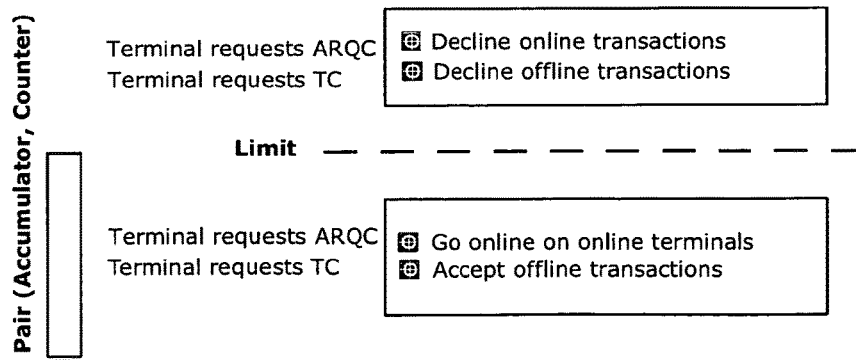
FIG. 11 illustrates a predominantly offline mode of processing according to an exemplary embodiment of the present invention.

FIG. 9 illustrates the standard CRM behavior. There are no specific requirements on the CIACs.

The CRM uses an accumulator or counter for transaction authorization decision as follows:

If the accumulator or counter is below (less than) the lower limit, the transaction is accepted offline even on an online capable terminal.

If the accumulator or counter reaches the lower limit (equal to or greater than), the transaction goes online to the issuer on an online capable terminal. The transaction is still accepted if it is not possible to go online, for example, when the terminal is offline only or when it was not possible to go online to the issuer.

If the accumulator or counter reaches the upper limit (equal to or greater than), the transaction goes online to the issuer on an online capable terminal; it is declined if the transaction cannot be processed online.

Three pieces of information are sent by the Card to the Issuer:
the script counter,
the values of the accumulators and counters, or their associated balances and
the Application Transaction Counter of the last online transaction.

All these data elements are included in the Issuer Application Data.

The script counter is a counter incrementing with each successful issuer script.

The Application Control has a setting to make the counter:
Reset after each successful online transaction and to decide whether Issuer Authentication is required as part of a successful online transaction.
A cyclic counter, so that the counter returns to zero when the total number of scripts is a multiple of a number such as 16. This allows a better tracking of the number of scripts executed by the card.

The Issuer Application Data can be configured to include accumulators, counters or both, in plain text or encrypted. The value of an accumulator or counter included in the IAD may be either its absolute value (i.e., Accumulator Amount or Counter Number) or the value of their balance, as indicated in the control parameter associated with it.

If so, then the Issuer Application Data is extended with one or two, 8 byte fields. For such an 8 byte field the rules are as follows:
In its 1st 6 bytes, it may contain a combination of the following elements: an accumulator or the associated balance, a counter or the associated balance or 'FF' padding
Byte 7 may contain a counter (or the associated balance) or 'FF' padding
Byte 8 always contains 'FF' padding
The 8 byte fields are filled in the following order:
Accumulators before counters—as far as space allows
Counters before padding—except for the mandatory padding of the 8th byte.

An example is illustrated in Table 4. This example includes two accumulators and two counters:

TABLE 4

Counters field in Issuer Application Data - example

| Byte 1-6 | Accumulator 1 |
| Byte 7 | Counter 1 |
| Byte 8 | 'FF' - mandatory padding |
| Byte 9-14 | Accumulator 2 |
| Byte 15 | Counter 2 |
| Byte 16 | 'FF' - mandatory padding |

The accumulators and counters can be encrypted. If encrypted, then the encryption is done on the whole 8 byte field(s). If the accumulators and counters are encrypted and the Application Control has a setting to include the counters in the calculation of the AC, then the encrypted version is always included in the calculation of the AC.

The Last Online Application Transaction Counter (LOATC) contains the Application Transaction Counter (ATC) of the last completed online transaction. If included in the Issuer Application Data, then it is included in the calculation of the AC. The data element is appended as the last element in the Issuer Application Data, after the counters, and it is not encrypted.

In accordance with embodiments of the present invention two types information can be sent from the Issuer to the card:
updates in the Issuer Authentication Data and updates using scripts.

The Issuer Authentication Data can include instructions for approving or declining the online transaction, updating the accumulators or counters and can update other variables as well. The issuer can encode accumulator or counter updates in the ARPC Response Code field of the Issuer Authentication Data. In this case, an issuer instruction consists of two items:
One of the four actions:
1. Do not update accumulator/counter
2. Set accumulator or counter to upper limit
3. Reset accumulator or counter to zero
4. Add transaction to accumulator or counter The coding of these actions is:
The accumulator(s) and counter(s) impacted by the action are identified through a bitmap coding. For reasons of backward compatibility with existing ARPC Response Codes, the coding used is unconventional: the bits are set to '0' to indicate that accumulator or counter is impacted.

Through the ARPC Response Code, the issuer can also:
1. Update the PIN Try Counter
2. Update the Go Online on Next Transaction setting
3. Decline if prior to the $2^{nd}$ GENERATE AC no valid ISSUER UPDATES command was received.

The last action is linked to the "ISSUER UPDATES" command that is a novel feature of all embodiments of the present invention. The ISSUER UPDATES command contains values for accumulators, counters and limits that are only applied at the end of the $2^{nd}$ GENERATE AC, e.g. conditional on successful processing of Issuer Authentication Data. The ARPC Response Code can indicate whether the transaction should be declined (AAC) if the ISSUER UPDATES command was not received or be processed independently of the presence of the ISSUER UPDATES command. The benefit of this novel feature over existing procedures is that the integrity of the Payment Device's balance (the Pre-authorized Amount) is maintained regardless of whether the script or Issuer Authentication are processed correctly by the card, whereas in other systems it is possible (indeed likely) that errors in transmission or torn transactions will lead to an inconsistent balance in the event that the instructions in one or more Put Data script(s) and instructions in the Issuer Authentication Data are not all received and correctly processed by the Payment Device.

Note that in case of the former, the $2^{nd}$ GENERATE AC will still process the instructions in the ARPC Response Code that do not refer to accumulators or counters, namely 'Update PIN Try Counter' and 'Set Go Online on Next Transaction'.

The following scripts are supported:
APPLICATION BLOCK
APPLICATION UNBLOCK
PIN CHANGE/UNBLOCK
UPDATE RECORD
ISSUER UPDATES
PUT DATA The ISSUER UPDATES command and the PUT DATA command can be used for offline balance update.

The present invention provides a script, the ISSUER UPDATES command. This script command has an impact on the processing of the $2^{nd}$ GENERATE AC. The ISSUER UPDATES command contains values for accumulators, counters and limits which are applied at the end of the $2^{nd}$ GENERATE AC, and then only when the following conditions are met:
  Successful verification of the Issuer Authentication Data.
  The Application Cryptogram (TC/AAC) requested by the terminal matches the issuer's response (approve/decline).

As for the other scripts, the ISSUER UPDATES command is protected with a MAC for integrity and authenticity. The data of the ISSUER UPDATES command has variable length. It has a minimum three bytes and it has an upper limit of 45 bytes. This block may encode any combination of the binary values of the accumulators or counters or their limits.
The 1st three bytes have the following meaning:
The 1st byte indicates the type of issuer updates.
The 2nd byte contains a bitmap to indicate the presence or absence of the accumulators:
  b8b7: '00'——RFU
  b6b5b4: a bit set indicates the presence of one of the three data elements of Accumulator 1 namely: Accumulator 1 Amount, Accumulator 1 Lower Limit and Accumulator 1 Upper Limit respectively
  b3b2b1: same as b6b5b4 but for Accumulator 2.
The 3rd byte contains a bitmap to indicate the presence or absence of the counters:
  b8b7: '00'—RFU
  b6b5b4: a bit set indicates the presence of one of the data elements of Counter 1 namely: Counter 1 Number, Counter 1 Lower Limit and Counter 1 Upper Limit respectively.
  b3b2b1: same as b6b5b4 but for Counter 2.

In the updates, the issuer already anticipates the outcome of the transaction and includes the transaction amount of the current transaction in its setting of the final balance. Therefore, the updates will only be applied if the issuer response (approve/decline) and the card's application cryptogram (TC/AAC) match.

Figure 12:
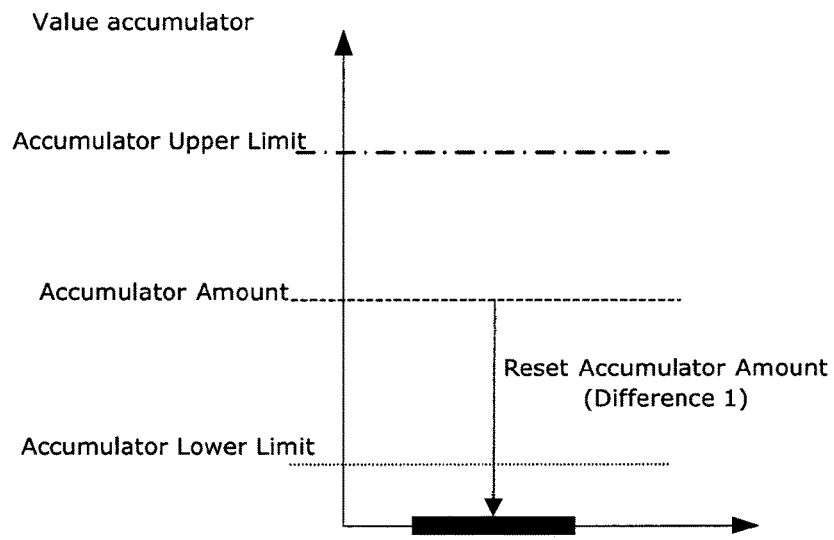
FIG. 12 illustrates how an Offline Accumulator Balance is updated according to an exemplary embodiment of the present invention.
Figure 12:
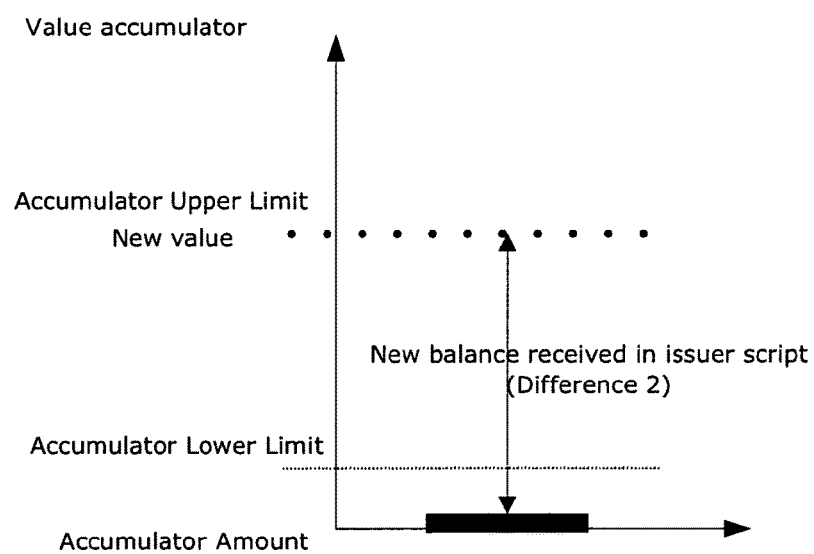

A PUT DATA command can be used for updating the offline balance. The offline balance is defined as the difference between the upper limit and corresponding accumulator or counter. If P1P2 of the PUT DATA command contains the tag of a balance then
  The accumulator or counter associated to this balance is set to zero
  The upper limit of this accumulator or counter is set to the value indicated in the command data of the PUT DATA command.
The reset of the accumulator or counter and the setting of the upper limit must be atomic. The above is illustrated in FIG. 12 for an accumulator.

Although the present invention has been described with reference to certain preferred embodiments, various modifications, alterations, and substitutions will be known or obvious to those skilled in the art without departing from the spirit and scope of the invention, as defined by the appended claims.

For example, in any embodiment of the present invention if the terminal requests an AAC in combination with CDA in the GENERATE AC command, the application running on the card is adapted to generate a CDA signature over the AAC. This may serve for proving a card's offline authentication without doing a payment. This supports data storage (IDS) and serves a need for using a payment device for a simple authentication without payment.

Another optional embodiment that can be used with any of the other embodiments of the present invention is that the contactless interface can be disabled to prevent detection of the payment device such as a card, e.g. when going through the mail, e.g. on its way to cardholder. The issuer can personalize the card to activate the contactless interface through an issuer script or after a successful contact $1^{st}$ GENERATE AC command. The latter option requires activation in the Application Control.

A safeguard mechanism can be provided so that the contact interface and the contactless interface cannot be deactivated at the same time. The data element that controls the activation/deactivation of each interface (Interface Enabling Switch) can be accessed through the suitable commands. Complete deactivation of the contactless interface can be inconvenient if the issuer, an agent of the issuer or a personalization bureau wants to apply quality control and check whether the contactless data has been personalized correctly. To allow some contactless data to be read over the contact interface, the following can be provided:
  A contact command can be provided to read both the contact and contactless Application File Locator (AFL).
  A further contact command can be provided to read all the files and records that are not listed in the Read Record Filter. An attempt to read a combination (file, record) that is listed in the filter results in an error. When the contact instance of the Read Record Filter is empty, then this contact command can read all the records included in the contact and contactless Application File Locator.

What is claimed is:

1. A method of managing a payment device in a financial transaction between an issuer node and the payment device via a terminal across a payment network, the payment device being issued by an issuer or an agent of the issuer, the financial transaction being routed at an application layer from the issuer node to the terminal, comprising:
  determining, by the issuer node, Issuer Authentication Data and extended Issuer Authentication Data associated with the payment device, wherein the extended Issuer Authentication Data comprises one or more updates to one or more updated values stored in a non-volatile memory of the payment device;
  packaging, by the issuer node, the extended Issuer Authentication Data in a first component configured to be executed by the payment device prior to receipt of a second component, wherein the first component comprises a first byte capacity;
  packaging, by the issuer node, the Issuer Authentication Data in a second component configured for completing the financial transaction and applying the Issuer Authentication Data, wherein the second component comprises a second byte capacity which is less than the first byte capacity of the first component;

routing, by the issuer node, the first component through the payment network to the payment device;

causing the payment device, upon receiving the first component, to provisionally store the extended Issuer Authentication Data in a volatile memory of the payment device without losing prior values corresponding to the extended Issuer Authentication Data stored in the non-volatile memory of the payment device; and causing the payment device, upon receiving the second component, to apply the extended Issuer Authentication Data to the non-volatile memory on the payment device to replace the prior values with the one or more updated values when the payment device has issued a confirmation that the financial transaction has been completed in accordance with the outcome requested by the issuer or the agent and upon successful verification of the Issuer Authentication Data.

2. The method of claim 1, wherein the replacement is only carried out when the payment device has successfully authenticated instructions from the issuer or the agent in accordance with an authentication process.

3. The method of claim 1, wherein the confirmation is an application cryptogram.

4. The method of claim 1, wherein the outcome requested by the issuer or the agent is approval or denial.

5. The method of claim 2 further comprising:

storing on said payment device a pre-authorized limit representing a maximum value which is utilized with said payment device for at least one off-line transaction without communication with said issuer or said agent via said payment network for authorization of said at least one off-line transaction;

storing on said payment device a pre-authorized balance representing a value of transactions conducted with said payment device without on-line communication with said payment network;

utilizing said payment device for conducting said at least one off-line transaction and reading from said payment device said pre-authorized balance, or said pre-authorized limit, and an account number associated with an account;

initiating an on-line authorization request when the value of said at least one off-line transaction is greater than the difference between said pre-authorized limit and said pre-authorized balance;

initiating an on-line authorization request by communicating with said payment network; and receiving authorization to conduct said at least one off-line transaction and updating said pre-authorized balance and said pre-authorized limit, wherein the issuer or the agent, through said payment device, updates the pre-authorized limit.

6. The method of claim 5, wherein the issuer or the agent, through said payment device, updates the pre-authorized balance.

7. The method of claim 5, further comprising:

receiving a denial prohibiting said at least one off-line transaction and updating said pre-authorized balance and said pre-authorized limit, wherein the issuer or the agent, through said payment device, is able to update the pre-authorized limit.

8. The method of claim 3, wherein the payment device receives a response code, and the extended Issuer Authentication Data is applied when the application cryptogram is the one defined by the response code.

9. The method of claim 8 wherein the response code has an indication whether the financial transaction should be declined when the extended Issuer Authentication Data was not received or whether the financial transaction should be processed independently of the presence of the extended Issuer Authentication Data.

10. The method of claim 1, wherein at least one of the first and second components is transferred securely from the terminal to the payment device.

11. The method of claim 10, wherein the secure transfer includes an error detection mechanism.

12. The method of claim 1, wherein the extended Issuer Authentication Data is calculated when the financial transaction has been completed successfully.

13. A system for managing a payment device in a financial transaction between an issuer node and the payment device via a terminal across a payment network, the payment device being issued by an issuer or an agent of the issuer, the financial transaction being routed at an application layer from the issuer node to the terminal, comprising:

the issuer node, configured for, determining Issuer Authentication Data and extended Issuer Authentication Data, associated with the payment device, wherein the extended Issuer Authentication Data comprises one or more updates to one or more updated values stored in a non-volatile memory of the payment device;

packaging the extended Issuer Authentication Data in a first component configured to be executed by the payment device prior to receipt of a second component, wherein the first component comprises a first byte capacity;

packaging the Issuer Authentication Data in a second component configured for completing the financial transaction and applying the Issuer Authentication Data, wherein the second component comprises a second byte capacity which is less than the first byte capacity of the first component;

routing the first component through the payment network to the payment device; the payment device, configured for, upon receiving the first component, to provisionally store the extended Issuer Authentication Data in a volatile memory of the payment device without losing prior values corresponding to the extended Issuer Authentication Data stored in the non-volatile memory of the payment device; and upon receiving the second component, to apply the extended Issuer Authentication Data to the non-volatile memory on the payment device to replace the prior values with the one or more updated values when the payment device has issued a confirmation that the financial transaction has been completed in accordance with the outcome requested by the issuer or the agent and upon successful verification of the Issuer Authentication Data.

14. The system of claim 13, wherein the payment device is adapted to apply the extended Issuer Authentication Data when the payment device has successfully authenticated instructions from the issuer or the agent in accordance with an authentication process.

15. The system of claim 13, wherein the confirmation is an application cryptogram.

16. The system of claim 13, wherein the outcome requested by the issuer or the agent is approval or denial.

17. The system of claim 14, further comprising:

the payment device having stored thereon a pre-authorized limit representing a maximum value which is utilized with said payment device for at least one off-line transaction without communication with said issuer or the agent via said payment network for authorization of said at least one off-line transaction;

the payment device having stored thereon a pre-authorized balance representing a value of transactions conducted with said payment device without on-line communication with said payment network;

means for reading from said payment device said pre-authorized balance or said pre-authorized limit, and an account number associated with an account;

means for determining to initiating an on-line authorization request when the value of said at least one off-line transaction is greater than the difference between said preauthorized limit and said pre-authorized balance;

the means for determining being adapted to initiate an online authorization request by communicating with said payment network; and means for receiving authorization to conduct said transaction and for updating by said payment device of said pre-authorized balance and said pre-authorized limit, wherein the issuer or the agent, through said payment device, updates the pre-authorized limit.

18. The system of claim 17, wherein the issuer or the agent, through said payment device, updates the pre-authorized balance.

19. The system of claim 17, further comprising:
the payment device being adapted to receive a denial prohibiting said at least one off-line transaction and updating by said payment device said pre-authorized balance and said pre authorized limit, wherein the issuer or the agent, through said payment device, is able to update the pre-authorized limit.

20. The system of claim 15, wherein the payment device is adapted to receive a response code, and the extended Issuer Authentication Data is applied when the application cryptogram is the one defined by the response code.

21. The system of claim 20 wherein the response code has an indication whether the financial transaction should be declined if the extended Issuer Authentication Data was not received or be processed independently of the presence of the extended Issuer Authentication Data.

22. The system of claim 13, wherein a connection between the terminal and the payment device is adapted such that at least one of the first and second components is transferred securely from the terminal to the payment device.

23. The system of claim 22, wherein the connection for securely transferring includes an error detection mechanism.

24. The system of claim 13, wherein the system is adapted to calculate the extended Issuer Authentication Data when the financial transaction has been completed successfully.

25. A payment device having a volatile memory and a nonvolatile memory, the payment device being for use in a financial transaction between an issuer node and the payment device via a terminal across a payment network, the payment device being issued by an issuer or an agent of the issuer, the financial transaction being routed at an application layer from the issuer node to the terminal, wherein the payment device is configured for:

receiving, from the issuer node, a first component through the payment network to the payment device, wherein, the issuer node determined Issuer Authentication Data and extended Issuer Authentication Data, associated with the payment device, wherein the extended Issuer Authentication Data comprises one or more updates to one or more updated values stored in a non-volatile memory of the payment device, and wherein the issuer node packaged the extended Issuer Authentication Data in a first component configured to be executed by the payment device prior to receipt of a second component, wherein the first component comprises a first byte capacity, and wherein the issuer node packaged the Issuer Authentication Data in a second component configured for completing the financial transaction and applying the Issuer Authentication Data, wherein the second component comprises a second byte capacity which is less than the first byte capacity of the first component;

upon receiving the first component, provisionally storing the extended Issuer Authentication Data in a volatile memory of the payment device without losing prior values corresponding to the extended Issuer Authentication Data stored in the non-volatile memory of the payment device; and upon receiving the second component, applying the extended Issuer Authentication Data to the non-volatile memory on the payment device to replace the prior values with the one or more updated values when the payment device has issued a confirmation that the financial transaction has been completed in accordance with the outcome requested by the issuer or the agent and upon successful verification of the Issuer Authentication Data.

* * * * *